United States Patent
Papasakellariou et al.

(10) Patent No.: US 10,111,217 B2
(45) Date of Patent: Oct. 23, 2018

(54) DOWNLINK SIGNALING FOR ADAPTION OF AN UPLINK-DOWNLINK CONFIGURATION IN TDD COMMUNICATION SYSTEMS

(71) Applicant: Samsung Electronics Co., Ltd, Suwon-si (KR)

(72) Inventors: Aris Papasakellariou, Houston, TX (US); Ying Li, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/246,494

(22) Filed: Aug. 24, 2016

(65) Prior Publication Data

US 2016/0366672 A1    Dec. 15, 2016

Related U.S. Application Data

(63) Continuation of application No. 14/220,944, filed on Mar. 20, 2014, now Pat. No. 9,538,515.
(Continued)

(51) Int. Cl.
*H04W 72/04*    (2009.01)
*H04L 5/14*    (2006.01)
(Continued)

(52) U.S. Cl.
CPC ............ *H04W 72/042* (2013.01); *H04L 1/00* (2013.01); *H04L 5/0037* (2013.01);
(Continued)

(58) Field of Classification Search
CPC ........ H04L 5/14; H04W 52/32; H04W 72/12; H04W 72/04
See application file for complete search history.

(56) References Cited

U.S. PATENT DOCUMENTS

2010/0027446 A1    2/2010    Choi et al.
2011/0002293 A1*   1/2011    Yuk ................... H04W 72/0406
                                                          370/329
(Continued)

FOREIGN PATENT DOCUMENTS

CN    102158978 A    8/2011
EP    2 498 435 A2    9/2012
(Continued)

OTHER PUBLICATIONS

European Patent Office, "Supplementary European Search Report," Application No. 14776026.8-1857, dated Oct. 18, 2016, 10 pages, publisher EPO, Munich, Germany, place of search, The Hague.
(Continued)

*Primary Examiner* — Anez Ebrahim

(57) ABSTRACT

An apparatus includes a User Equipment (UE) having a receiver and a decoder. The receiver is configured to receive, from an eNodeB (eNB), a signal indicating a configuration of a period to receive one or more Physical Downlink Control CHannels (PDCCHs) in respective one or more Transmission Time Intervals (TTIs). Each of the one or more PDCCHs conveys a same Downlink Control Information (DCI) format. The DCI format includes at least one field indicating a first Time Division Duplexing (TDD) UpLink-DownLink (UL-DL) configuration in a first cell for DL data receptions or UL data transmissions. A TDD UL-DL configuration includes ten TTIs each having a respective serial index from 0 to 9. The receiver is also configured to receive, from the eNB, at least one PDCCH of the one or more PDCCHs. The decoder is configured to decode the DCI format conveyed by the at least one PDCCH in a second cell. The period is a multiple of ten TTIs, and the one or more TTIs are in a last ten TTIs of the period.

28 Claims, 14 Drawing Sheets

Related U.S. Application Data

(60) Provisional application No. 61/806,268, filed on Mar. 28, 2013, provisional application No. 61/825,418, filed on May 20, 2013, provisional application No. 61/835,934, filed on Jun. 17, 2013, provisional application No. 61/896,561, filed on Oct. 28, 2013, provisional application No. 61/898,349, filed on Oct. 31, 2013, provisional application No. 61/907,906, filed on Nov. 22, 2013.

(51) Int. Cl.
| | | |
|---|---|---|
| *H04L 1/00* | (2006.01) | |
| *H04W 52/04* | (2009.01) | |
| *H04W 72/12* | (2009.01) | |
| *H04W 52/24* | (2009.01) | |
| *H04W 52/32* | (2009.01) | |
| *H04L 5/00* | (2006.01) | |
| *H04W 52/14* | (2009.01) | |

(52) U.S. Cl.
CPC .............. *H04L 5/0053* (2013.01); *H04L 5/14* (2013.01); *H04W 52/04* (2013.01); *H04W 52/243* (2013.01); *H04W 52/325* (2013.01); *H04W 72/1289* (2013.01); *H04W 52/146* (2013.01)

(56) References Cited

U.S. PATENT DOCUMENTS

| | | | |
|---|---|---|---|
| 2011/0070845 A1* | 3/2011 | Chen | ............... H04L 5/001 455/91 |
| 2011/0171985 A1 | 7/2011 | Papasakellariou et al. | |
| 2012/0039182 A1 | 2/2012 | Zhou et al. | |
| 2013/0010709 A1 | 1/2013 | Earnshaw et al. | |
| 2013/0044651 A1 | 2/2013 | Wang et al. | |
| 2014/0376422 A1 | 12/2014 | Dai et al. | |

FOREIGN PATENT DOCUMENTS

| | | |
|---|---|---|
| WO | 2012-142840 A1 | 10/2012 |
| WO | 2013025289 A1 | 2/2013 |

OTHER PUBLICATIONS

Samsung: "Dynamic reconfiguration of TDD UL-DL configuration," RI-122267, 3GPP TSG RAN WG1 Meeting #69, Prague, Czech Republic, May 21-25, 2012, 2 pages.

Qualcomm Incorporated: "Support of CA for different TDD UL-DL configurations," R1-122766, 3GPP TSG RAN WG1 #69, Prague, Czech Republic, May 21-25, 2012, 5 pages.

3GPP TS 36.211 V11.2.0 (Feb. 2013); 3rd Generation Partnership Project; Technical Specification Group Radio Access Network; Evolved Universal Terrestrial Radio Access (E-UTRA); Physical Channels and Modulation; Release 11; Feb. 2013; 109 pages.

3GPP TS 36.212 V11.2.0 (Feb. 2013); 3rd Generation Partnership Project; Technical Specification Group Radio Access Network; Evolved Universal Terrestrial Radio Access (E-UTRA); Multiplexing and channel coding; Release 11; Feb. 2013; 82 pages.

3GPP TS 36.213 V11.2.0 (Feb. 2013); 3rd Generation Partnership Project; Technical Specification Group Radio Access Network; Evolved Universal Terrestrial Radio Access (E-UTRA); Physical layer procedures; Release 11; Feb. 2013; 173 pages.

3GPP TS 36.331 V11.3.0 (Mar. 2013); 3rd Generation Partnership Project; Technical Specification Group Radio Access Network; Evolved Universal Terrestrial Radio Access (E-UTRA); Radio Resource Control (RRC); Protocol specification; Release 11; Mar. 2013; 344 pages.

International Search Report dated Jul. 16, 2014 in connection with International Patent Application No. PCT/KR2014/002681; 3 pages.

Written Opinion of International Searching Authority dated Jul. 16, 2014 in connection with International Patent Application No. PCT/KR2014/002681; 7 pages.

First Office Action regarding Chinese Patent Application No. 201480018536.4, dated Feb. 26, 2018, 15 pages.

Notification of Reason for Rejection regarding Japanese Patent Application No. 2016-505409, dated Apr. 9, 2018, 5 pages.

* cited by examiner

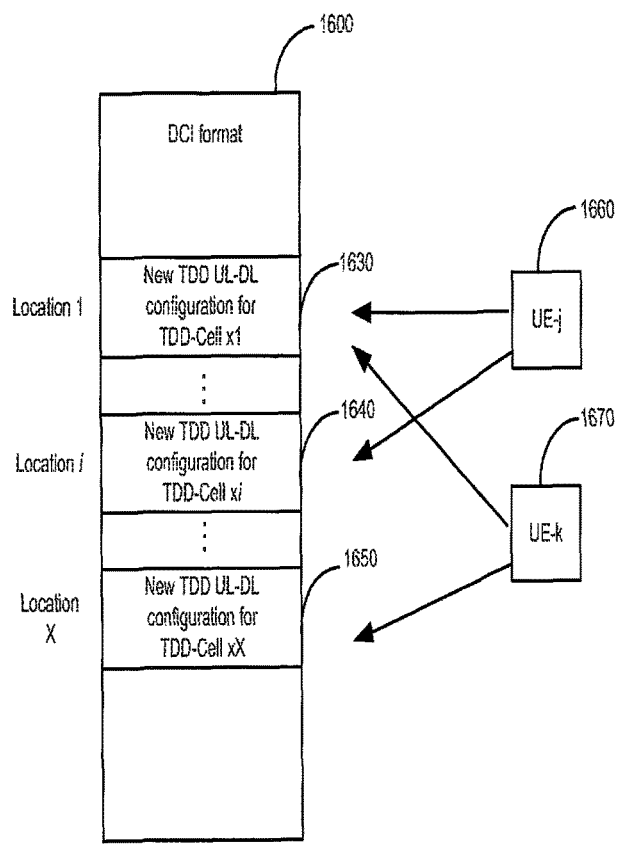 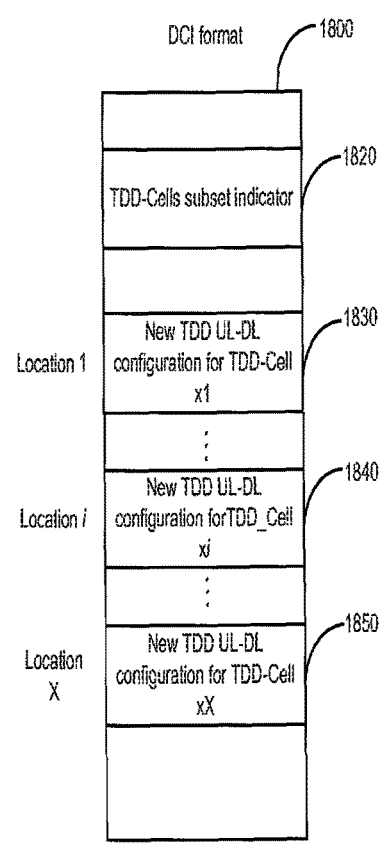
FIG. 16                    FIG. 18

DOWNLINK SIGNALING FOR ADAPTION OF AN UPLINK-DOWNLINK CONFIGURATION IN TDD COMMUNICATION SYSTEMS

CROSS-REFERENCE TO RELATED APPLICATION AND CLAIM OF PRIORITY

This application is a continuation of U.S. Non-Provisional patent application Ser. No. 14/220,944 filed Mar. 20, 2014 and entitled "DOWNLINK SIGNALING FOR ADAPTATION OF AN UPLINK-DOWNLINK CONFIGURATION IN TDD COMMUNICATION SYSTEMS," which claims priority to U.S. Provisional Patent Application No. 61/806,268 filed Mar. 28, 2013, U.S. Provisional Patent Application No. 61/825,418 filed May 20, 2013, U.S. Provisional Patent Application No. 61/835,934 filed Jun. 17, 2013, U.S. Provisional Patent Application No. 61/896,561 filed Oct. 28, 2013, U.S. Provisional Patent Application No. 61/898,349 filed Oct. 31, 2013, and U.S. Provisional Patent Application Ser. No. 61/907,906 filed Nov. 22, 2013. The above-identified provisional patent documents are hereby incorporated by reference in their entirety.

TECHNICAL FIELD

The present application relates generally to wireless communications and, more specifically, to downlink signaling for adaptation of an uplink-downlink configuration in time division duplex (TDD) communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

This disclosure provides downlink signaling for adaptation of an uplink-downlink configuration in time division duplex (TDD) communication systems.

In a first embodiment, a method includes transmitting, by an eNodeB (eNB) to a User Equipment (UE), a signal indicating a configuration of a period for the UE to receive one or more Physical Downlink Control CHannels (PDCCHs) in respective one or more Transmission Time Intervals (TTIs). Each of the one or more PDCCHs conveys a same Downlink Control Information (DCI) format. The DCI format includes at least one field indicating a first Time Division Duplexing (TDD) UpLink-DownLink (UL-DL) configuration in a first cell for DL data receptions or UL data transmissions from the UE. A TDD UL-DL configuration includes ten TTIs each having a respective serial index from 0 to 9. The method also includes transmitting, by the eNB to the UE, at least one PDCCH of the one or more PDCCHs. The at least one PDCCH is configured to be used by the UE to decode a respective DCI format in a second cell. The period is a multiple of ten TTIs, and the one or more TTIs are in a last ten TTIs of the period.

In a second embodiment, an apparatus includes an eNodeB (eNB) having a transmitter and a controller. The transmitter is configured to communicate with a User Equipment (UE). The controller is configured to initiate transmission to the UE of a signal indicating a configuration of a period for the UE to receive one or more Physical Downlink Control CHannels (PDCCHs) in respective one or more Transmission Time Intervals (TTIs). Each of the one or more PDCCHs conveys a same Downlink Control Information (DCI) format. The DCI format includes at least one field indicating a first Time Division Duplexing (TDD) UpLink-DownLink (UL-DL) configuration in a first cell for DL data receptions or UL data transmissions from the UE. A TDD UL-DL configuration includes ten TTIs each having a respective serial index from 0 to 9. The controller is also configured to initiate transmission to the UE of at least one PDCCH of the one or more PDCCHs. The at least one PDCCH is configured to be used by the UE to decode a respective DCI format in a second cell. The period is a multiple of ten TTIs, and the one or more TTIs are in a last ten TTIs of the period.

In a third embodiment, an apparatus includes a User Equipment (UE) having a receiver and a decoder. The receiver is configured to receive, from an eNodeB (eNB), a signal indicating a configuration of a period to receive one or more Physical Downlink Control CHannels (PDCCHs) in respective one or more Transmission Time Intervals (TTIs). Each of the one or more PDCCHs conveys a same Downlink Control Information (DCI) format. The DCI format includes at least one field indicating a first Time Division Duplexing (TDD) UpLink-DownLink (UL-DL) configuration in a first cell for DL data receptions or UL data transmissions. A TDD UL-DL configuration includes ten TTIs each having a respective serial index from 0 to 9. The receiver is also configured to receive, from the eNB, at least one PDCCH of the one or more PDCCHs. The decoder is configured to decode the DCI format conveyed by the at least one PDCCH in a second cell. The period is a multiple of ten TTIs, and the one or more TTIs are in a last ten TTIs of the period.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates an example DCI format according to this disclosure;

FIG. 18 illustrates another example DCI format according to this disclosure;

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

This disclosure relates to the adaptation of communication direction in wireless communication networks that utilize Time Division Duplex (TDD). A wireless communication network includes a DownLink (DL) that conveys signals from transmission points (such as base stations or eNodeBs) to user equipments (UEs). The wireless communication network also includes an UpLink (UL) that conveys signals from UEs to reception points such as eNodeBs. A UE, also commonly referred to as a terminal or a mobile station, may be fixed or mobile and may be a cellular phone, a personal computer device, and the like. An eNodeB, which is generally a fixed station, may also be referred to as an access point or other equivalent terminology.

Figure 1:
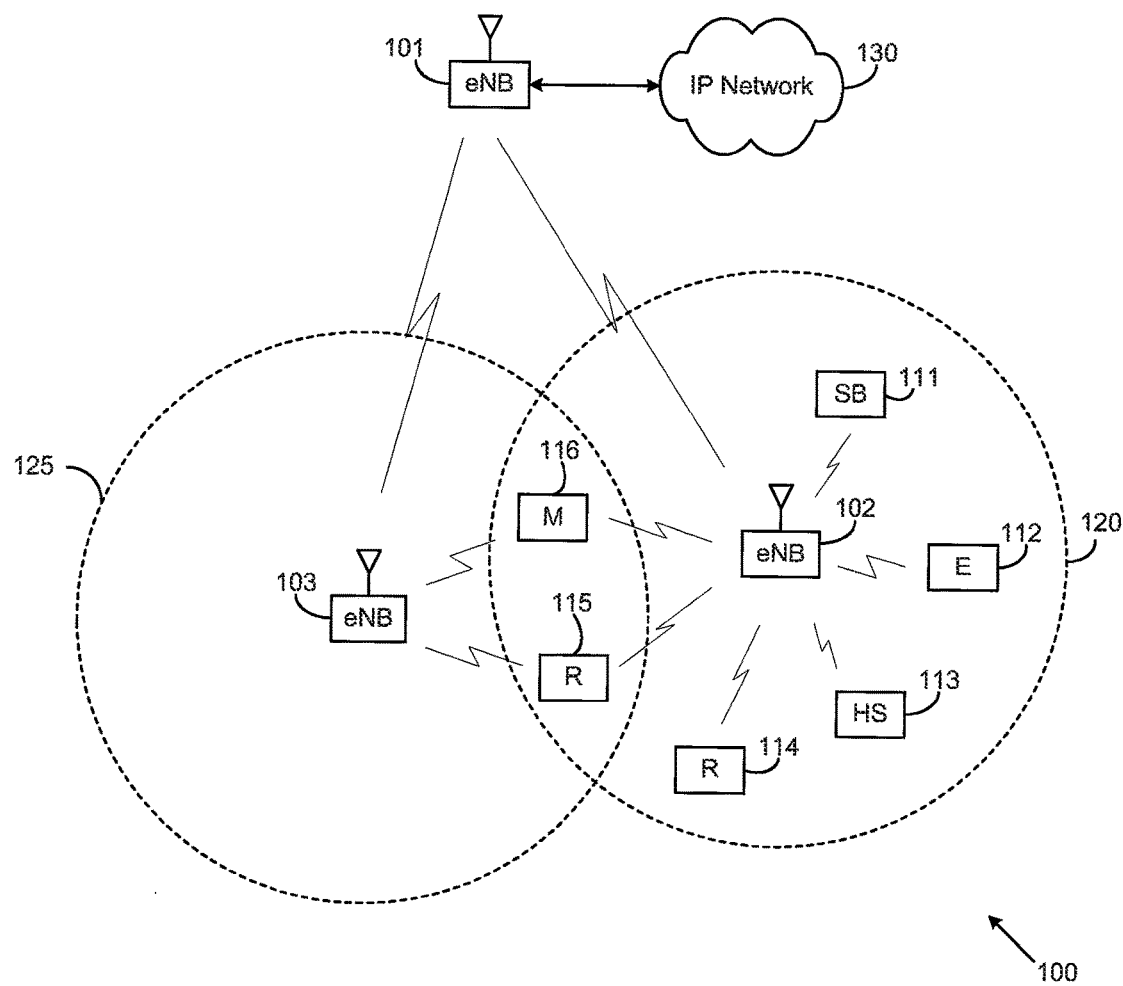
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, which can utilize TDD.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
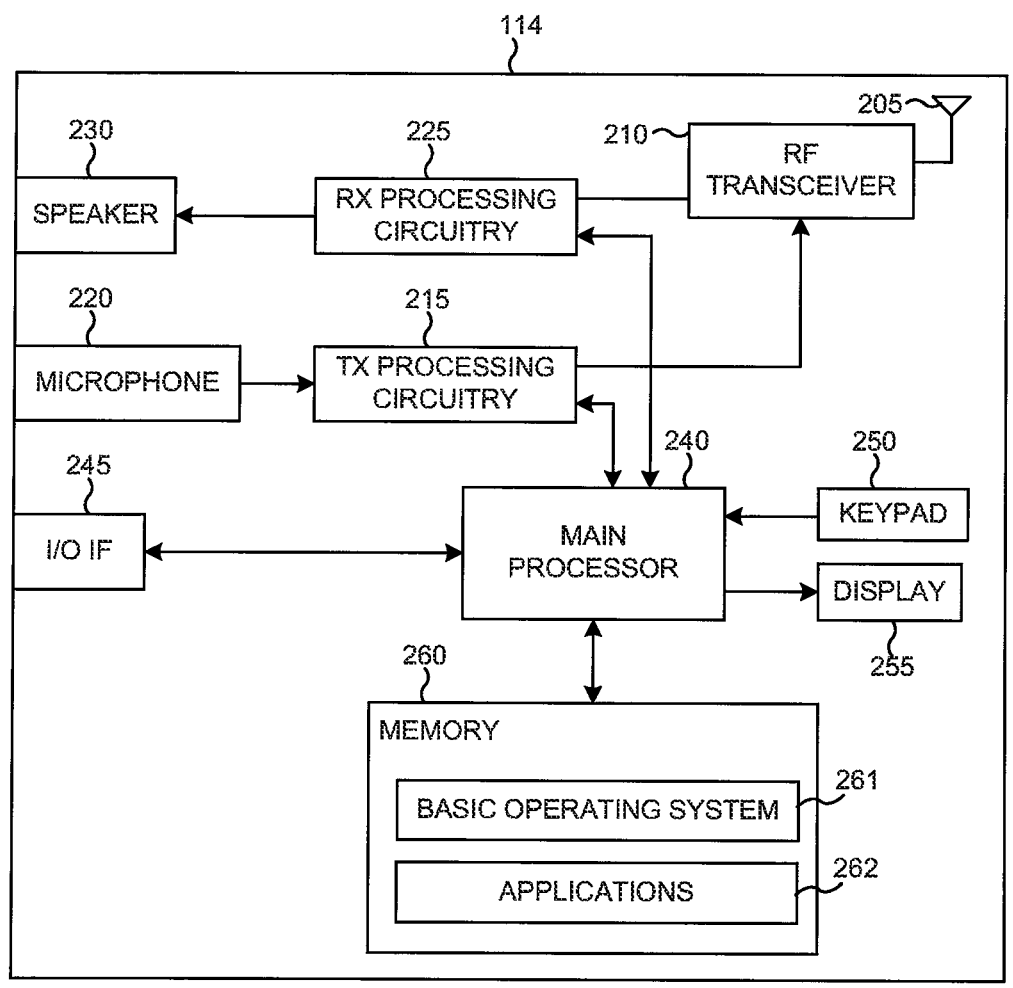
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE.

The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support downlink signaling for adaptation of an uplink-downlink configuration in TDD systems.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
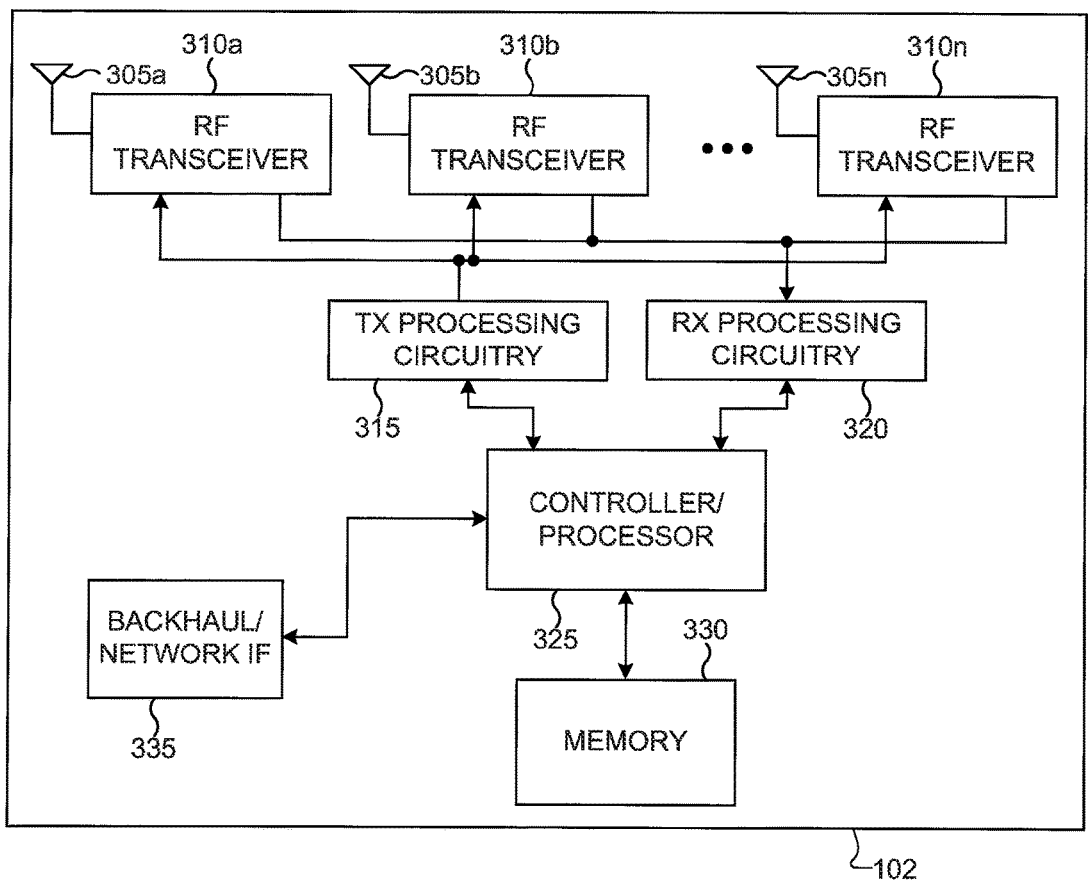
FIG. 3 illustrates an example eNodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support downlink signaling for adaptation of an uplink-downlink configuration in TDD systems.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. An eNB can transmit data information or DCI through respective Physical DL Shared CHannels (PDSCHs) or Physical DL Control CHannels (PDCCHs). An eNB can transmit one or more of multiple types of RS, including a UE-Common RS (CRS), a Channel State Information RS (CSI-RS), and a DeModulation RS (DMRS). A CRS can be transmitted over a DL system BandWidth (BW) and can be used by UEs to demodulate data or control signals or to perform measurements. To reduce CRS overhead, an eNB may transmit a CSI-RS with a smaller density in the time or frequency domain than a CRS. For Interference Measurements (IMs), CSI-IM resources associated with a Zero Power CSI-RS (ZP CSI-RS) can be used. A UE can determine CSI-RS transmission parameters through higher-layer signaling from an eNB. DMRS is transmitted only in the BW of a respective PDSCH or PDCCH, and a UE can use the DMRS to demodulate information in a PDSCH or PDCCH. An eNB can also indicated to a UE, through a System Information Block (SIB) transmitted to a group of UEs, that a DL Transmission Time Interval (TTI), in each period of 10 successive TTIs, is configured as a Multicast-Broadcast Single Frequency Network (MBSFN) TTI, in which case the UE can expect a CRS to be transmitted only in the first one or two symbols of the TTI.

In some wireless networks, UL signals can include data signals conveying information content, control signals conveying UL Control Information (UCI), and RS. A UE can transmit data information or UCI through a respective Physical UL Shared CHannel (PUSCH) or a Physical UL Control CHannel (PUCCH). If a UE simultaneously transmits data information and UCI, the UE can multiplex both in a PUSCH. The UCI can include Hybrid Automatic Repeat reQuest ACKnowledgement (HARQ-ACK) information indicating correct or incorrect detection of data Transport Blocks (TBs) in a PDSCH, Scheduling Request (SR) information indicating whether a UE has data in its buffer, and Channel State Information (CSI) enabling an eNB to select appropriate parameters for PDSCH transmissions to a UE. HARQ-ACK information can include a positive ACKnowledgement (ACK) in response to a correct PDCCH or data TB detection, a Negative ACKnowledgement (NACK) in response to an incorrect data TB detection, and an absence of a PDCCH detection (DTX) that can be implicit or explicit. A DTX could be implicit if a UE does not transmit a HARQ-ACK signal. A DTX can be explicit if a UE can identify missed PDCCHs in other ways (it is also possible to represent NACK and DTX in a same NACK/DTX state). The UL RS can include DMRS and Sounding RS (SRS). DMRS can be transmitted only in a BW of a respective PUSCH or PUCCH, and an eNB can use a DMRS to demodulate information in a PUSCH or PUCCH. SRS can be transmitted by a UE in order to provide an eNB with an UL CSI. SRS transmission from a UE can be periodic (P-SRS) at predetermined TTIs with transmission parameters configured to the UE by higher-layer signaling, such as Radio Resource Control (RRC) signaling. SRS transmission can also be aperiodic (A-SRS) as triggered by a DCI format conveyed by a PDCCH scheduling a PUSCH or a PDSCH.

DCI can serve several purposes. A DCI format in a respective PDCCH can schedule a PDSCH or a PUSCH transmission conveying data information to or from a UE, respectively. In some implementations, a UE monitors a DCI format 1A for PDSCH scheduling and a DCI format 0 for PUSCH scheduling. These two DCI formats are designed to have the same size and can be jointly referred to as DCI format 0/1A. Another DCI format, DCI format 1C, in a respective PDCCH can schedule a PDSCH providing System Information Blocks to a group of UEs for network configuration parameters, or a response to a Random Access (RA) by UEs, or paging information to a group of UEs, and so on. Another DCI format, DCI format 3 or DCI format 3A (jointly referred to as DCI format 3/3A) can provide Transmission Power Control (TPC) commands to a group of UEs for transmissions of respective PUSCHs or PUCCHs.

A DCI format typically includes Cyclic Redundancy Check (CRC) bits in order for a UE to confirm a correct detection. A DCI format type is identified by a Radio Network Temporary Identifier (RNTI) that scrambles the CRC bits. For a DCI format scheduling a PDSCH or a PUSCH to a single UE, the RNTI can be a Cell RNTI (C-RNTI) and serves as a UE identifier. For a DCI format scheduling a PDSCH conveying a SIB to a group of UEs, the RNTI can be an SI-RNTI. For a DCI format scheduling a PDSCH providing a response to a RA from a group of UEs, the RNTI can be an RA-RNTI. For a DCI format scheduling a PDSCH paging a group of UEs, the RNTI can be a P-RNTI. For a DCI format providing TPC commands to a group of UEs, the RNTI can be a TPC-RNTI. Each RNTI type can be configured to a UE through higher-layer signaling such as RRC signaling (and a C-RNTI is unique to each UE).

Figure 4:
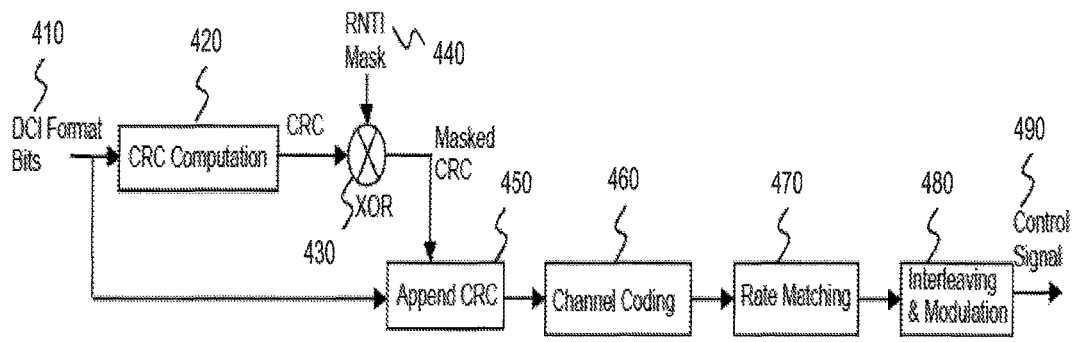
FIG. 4 illustrates an example encoding process for a downlink control information (DCI) format for use with an eNB according to this disclosure.

FIG. 4 illustrates an example encoding process for a DCI format for use with an eNB according to this disclosure. As shown in FIG. 4, an eNB (such as eNB 101-103) separately codes and transmits each DCI format in a respective PDCCH. A RNTI for a UE, for which a DCI format is intended, masks a CRC of a DCI format codeword in order to enable the UE to identify that a particular DCI format is intended for the UE. The CRC of (non-coded) DCI format bits 410 is determined using a CRC computation operation 420, and the CRC is masked using an exclusive OR (XOR) operation 430 between CRC bits and RNTI bits 440. The XOR operation 430 is defined as XOR(0,0)=0, XOR(0,1)=1, XOR(1,0)=1, XOR(1,1)=0. The masked CRC bits are appended to DCI format information bits using a CRC append operation 450. Channel coding is performed using a channel coding operation 460 (such as convolutional coding), followed by a rate matching operation 470 applied to allocated resources. Interleaving and modulation operations 480 are performed, and the output control signal 490 is transmitted. In the present example, both a CRC and an RNTI include 16 bits; however, it will be understood that either or both of the CRC and the RNTI could include more or fewer than 16 bits.

Figure 5:
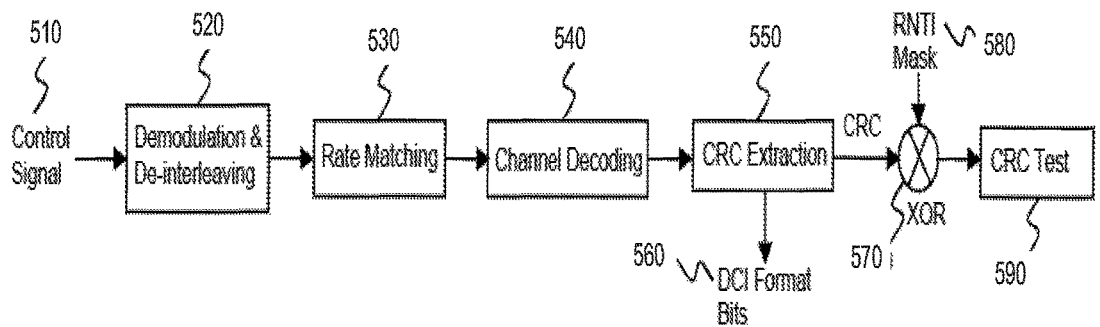
FIG. 5 illustrates an example decoding process for a DCI format for use with a UE according to this disclosure.

FIG. 5 illustrates an example decoding process for a DCI format for use with a UE according to this disclosure. As shown in FIG. 5, a UE (such as UE 111-116) performs reverse operations of an eNB transmitter to determine whether the UE has a DCI format assignment in a DL TTI. A received control signal 510 is demodulated and the resulting bits are de-interleaved at operation 520. A rate matching applied at an eNB transmitter is restored through operation 530, and data is decoded at operation 540. After decoding the data, DCI format information bits 560 are obtained after extracting CRC bits 550. The DCI format information bits are de-masked 570 by applying the XOR operation with a UE RNTI 580. A UE performs a CRC test 590. If the CRC test passes, the UE determines that the DCI format corresponding to the received control signal 510 is valid and determines parameters for signal reception or signal transmission. If the CRC test does not pass, the UE disregards the presumed DCI format.

PDCCH transmissions can be either Time Division Multiplexed (TDM) or Frequency Division Multiplexed (FDM) with PDSCH transmissions. For convenience of explanation, the TDM case is considered herein. However, this disclosure is also applicable to other multiplexing methods. To avoid a PDCCH transmission to a UE blocking a PDCCH transmission to another UE, a location of each PDCCH transmission in the time-frequency domain of a DL control region is not unique. As a consequence, each UE can perform multiple decoding operations to determine whether there are PDCCHs intended for the UE in a DL TTI. The resources carrying each PDCCH can be grouped into Control Channel Elements (CCEs) in the logical domain. For a given number of DCI format bits, a number of CCEs for a respective PDCCH depends on a channel coding rate (Quadrature Phase Shift Keying (QPSK) is assumed as the modulation scheme). An eNB can use a lower channel coding rate and more CCEs for a PDCCH transmission to a UE experiencing low DL Signal-to-Interference and Noise Ratio (SINR) than to a UE experiencing a high DL SINR. The CCE aggregation levels can, for example, include 1, 2, 4, and 8 CCEs.

DCI formats conveying information to multiple UEs, such as DCI format 1C or DCI format 3/3A, can be transmitted in a UE Common Search Space (CSS). If enough CCEs remain after the transmission of DCI formats conveying information to multiple UEs, a CSS can also convey DCI formats 0/1A for scheduling respective PDSCHs or PUSCHs to individual UEs. A DCI format conveying scheduling information for a PDSCH reception or a PUSCH transmission to a single UE, such as DCI format 0/1A, can be transmitted in a UE Dedicated Search Space (UE-DSS). For example, a CSS can include 16 CCEs and support 2 DCI formats with 8 CCEs, 4 DCI formats with 4 CCEs, or 1 DCI format with 8 CCEs and 2 DCI formats with 4 CCEs. The CCEs for a CSS are placed first in the logical domain (prior to a CCE interleaving).

In a TDD communication system, the communication direction in some TTIs is in the DL, and the communication direction in some other TTIs is in the UL. TABLE 1 lists indicative UL-DL configurations over a period of 10 TTIs, which is also referred to as frame period. "D" denotes a DL TTI, "U" denotes a UL TTI, and "S" denotes a special TTI that includes a DL transmission field referred to as DwPTS, a Guard Period (GP), and a UL transmission field referred to as UpPTS. Several combinations exist for the duration of each field in a special TTI subject to the condition that the total duration is one TTI.

TABLE 1

TDD UL-DL configurations

| TDD UL-DL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The TDD UL-DL configurations in TABLE 1 provide 40% and 90% of DL TTIs per frame to be DL TTIs (and the remaining to be UL TTIs). Despite this flexibility, a semi-static TDD UL-DL configuration that can be updated every 640 msec or less frequently by SIB signaling or, in case of DL Carrier Aggregation and a secondary cell by RRC signaling, may not match well with short-term data traffic conditions. For the remainder of this disclosure, such a TDD UL-DL configuration will be referred to as a conventional TDD UL-DL configuration and it is assumed to be used by legacy UEs in a cell. For this reason, a faster adaptation of a TDD UL-DL configuration can improve system throughput, particularly for a low or moderate number of connected UEs. For example, when there is more DL traffic than UL traffic, the TDD UL-DL configuration can be adapted to include more DL TTIs. Signaling for faster adaptation of a TDD UL-DL configuration can be provided by several mechanisms, including by a DCI format in a PDCCH.

An operating constraint in an adaptation of a conventional TDD UL-DL configuration is the possible existence of UEs that cannot be aware of such adaptation. Such UEs are referred to as conventional UEs. Since conventional UEs perform measurements in DL TTIs using a respective CRS, such DL TTIs cannot be changed to UL TTIs or to special TTIs by a non-conventional adaptation of a TDD UL-DL configuration. However, an UL TTI can be changed to a DL TTI without impacting conventional UEs because an eNB can ensure that such UEs do not transmit any signals in such UL TTIs. In addition, at least one UL TTI common to all adapted TDD UL-DL configurations can exist to enable an eNB to possibly select this UL TTI for PUCCH transmissions. In some implementations, this UL TTI is TTI#2.

A TTI is referred to as a DL flexible TTI if it is an UL TTI in a conventional TDD UL-DL configuration and is adapted to a DL TTI. A TTI is referred to as a UL flexible TTI if it is an UL TTI in a conventional TDD UL-DL configuration that could be adapted to a DL TTI in an adapted TDD UL-DL configuration but it remains an UL TTI. A TTI is referred to as DL fixed TTI if it is a DL TTI in a conventional TDD UL-DL configuration. A TTI is referred to as UL fixed TTI if it is an UL TTI in a TDD UL-DL configuration a UE uses to determine UL TTIs for transmitting HARQ-ACK information in response to PDSCH receptions (or in response to a release of a semi-persistently scheduled PDSCH). A special TTI in a conventional TDD UL-DL configuration can be adapted only to a DL TTI. For single-cell operation, a TDD UL-DL configuration can be configured by an eNB to a UE for determining transmission timing for HARQ-ACK information transmitted by the UE in response to PDSCH receptions (or SPS PDSCH release). This is referred to as DL HARQ reference TDD UL-DL configuration. A TDD UL-DL configuration can be configured by an eNB to a UE for determining transmission timing for HARQ-ACK information in response to PUSCH transmissions from the UE to the eNB and for DCI formats scheduling the PUSCH transmissions. This is referred to as UL HARQ reference TDD UL-DL configuration. The UL HARQ reference TDD UL-DL configuration can be the same as the conventional TDD UL-DL configuration used in the cell.

Considering the above, TABLE 2 indicates flexible TTIs (denoted by 'F') for each TDD UL-DL configuration in TABLE 1. As DL TTIs in a conventional TDD UL-DL configuration cannot be changed to UL TTIs, not all TDD UL-DL configurations can be used for adaptation. For example, if TDD UL-DL configuration 2 is the conventional one, an adaptation can be only to TDD UL-DL configuration 5. Therefore, an indication for an adaptation for a TDD UL-DL configuration can be considered by UE 114 as invalid if, for example, it switches a DL TTI in the conventional TDD UL-DL configuration in an UL TTI. Invalid indications can be caused, by example, by the misdetection from UE 114 of a DCI format conveying an indication for an adapted TDD UL-DL configuration.

TABLE 2

Flexible TTIs (F) for TDD UL-DL configurations

| TDD UL-DL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | F | F | D | F | F | F | F |
| 1 | 5 ms | D | S | U | F | D | D | F | F | F | D |
| 2 | 5 ms | D | S | U | D | D | D | F | F | D | D |
| 3 | 10 ms | D | S | U | F | F | D | D | D | D | D |
| 4 | 10 ms | D | S | U | F | D | D | D | D | D | D |
| 5 | 10 ms | D | S | U | D | D | D | D | D | D | D |
| 6 | 5 ms | D | S | U | F | F | D | F | F | F | D |

A power of UL transmissions in UL flexible TTIs can be different than in UL fixed TTIs because interference in UL flexible TTIs may be from a combination of DL transmissions or UL transmissions in adjacent cells, while interference in UL fixed TTIs is usually from UL transmissions in adjacent cells. Two separate UL Power Control (PC) processes can be considered: one for use in UL fixed TTIs and another for use in UL flexible TTIs. Each UL PC process can have separate Open Loop PC (OLPC) processes through respective values of $P_{O\_PUSCH}$ and α or can have separate Closed Loop PC (CLPC) processes through separate applications of TPC commands $δ_{PUSCH}$. However, having a single UL PC process for UL flexible TTIs may not be sufficient when different UL flexible TTIs can experience different interference characteristics.

Assume that only dynamically scheduled PUSCH and SRS transmissions can occur in UL flexible TTIs. Since an adaptation of a TDD UL-DL configuration is assumed to be faster than a configuration by higher-layer signaling of parameters for periodic PUSCH or SRS transmission, $P_{O\_PUSCH}(0)$ and α(0) can remain the same, regardless of a TDD DL-UL configuration. First values of $P_{O\_PUSCH}(1)$ and α(1) can be used for UL fixed TTIs and some UL flexible TTIs where a UE experiences UL-dominant interference, and second values of $P_{O\_PUSCH}(1)$ and α(1) can be used for remaining UL flexible TTIs where the UE experiences DL-dominant interference. The first values can be used when a UE experiences UL-dominant interference (from signal transmissions from other UEs). The second values can be used when a UE experiences DL-dominant interference (from signal transmissions from other eNBs). With an adaptation of a TDD UL-DL configuration, at least DL-dominant interference can change, which can then involve a use of different second values of $PP_{O\_PUSCH}(1)$ and α(1) in some UL flexible TTIs. Additionally, values for TPC commands $δ_{PUSCH}$ can also be different when a PUSCH or SRS transmissions from a UE experiences UL dominant interference and when it experiences DL-dominant interference. For notational simplification, $P_{O\_PUSCH}(1)$ and α(1) are subsequently referred to as $P_{O\_PUSCH}$ and α.

To extend a transmission bandwidth for a UE and support higher data rates, Carrier Aggregation (CA) can be used, where multiple component carriers (or cells) are aggregated and jointly used for transmission to the UE (DL CA) or from the UE (UL CA). In some implementations, up to five component carriers can be aggregated for a UE. An eNB can have more than five component carriers. The number of component carriers used for DL CA can be different than the number of component carriers used for UL CA. Before CA is configured, a UE may have only one RRC connection with a network. One serving cell provides the mobility information at RRC connection establishment/re-establishment/handover and the security input at RRC connection re-establishment/handover. This cell is referred to as the Primary Cell (PCell). Depending on a UE's capabilities, DL or UL Secondary Cells (SCells) can be configured to the UE to form (together with the PCell) a set of serving cells and additional cells are referred to as Secondary Cells (SCells). The PCell and the SCells configured for a UE may not have the same TDD UL-DL configuration, including the same adaptation of a TDD UL-DL configuration in cells where such adaptation is enabled. In case an eNB supports CA and adaptation of TDD UL-DL configurations, a DCI format indicating adapted TDD UL-DL configurations can include respective three-bit indicators for multiple cells.

Embodiments of this disclosure provide a DL signaling mechanism for supporting frequent adaptations of a TDD UL-DL configuration, either for a group of UEs or for an individual UE. Embodiments of this disclosure also ensure a desired detection reliability for a DL signaling for an adaptation of a TDD UL-DL configuration. Moreover, embodiments of this disclosure provide a mechanism to inform a UE of a new set of parameters to use for transmitting or receiving signals after an adaptation of a TDD UL-DL configuration. Furthermore, embodiments of this disclosure provide a mechanism for a UE configured with a CA operation to support operation with an adapted TDD UL-DL configuration in a cell where the UE is configured for operation with an adaptive TDD UL-DL configuration.

UE-Common DL Signaling for Adapting a TDD UL-DL Configuration

In this embodiment, higher-layer signaling can inform a UE of a periodicity for an, adaptation of a TDD UL-DL configuration (such as the number of TTIs for assuming a TDD UL-DL configuration is valid) and a configuration of a UE-common DL signaling that informs of an adaptation of a TDD UL-DL configuration. The higher-layer signaling can use, for example, an Information Element (IE) 'ConfigureTDD-ULDL-Adapt'. This UE-common DL control signaling (PDCCH) is referred to as TDD-ULDL-Adapt. The configuration of TDD-ULDL-Adapt can include a DCI format conveyed by TDD-ULDL-Adapt (if it is not uniquely determined by the specification of the TDD UL-DL adaptation operation) and a TDD-RNTI used to scramble the CRC of the DCI format.

In case of UE-common control signaling (for all UEs or for a group of UEs), if HARQ-ACK feedback is supported for TDD-ULDL-Adapt, the configuration of TDD-ULDL-Adapt can also include a configuration of a PUCCH resource for the UE to transmit HARQ-ACK information (DTX or ACK) regarding a detection of TDD-ULDL-Adapt. For example, a respective PUCCH transmission can be in a first possible UL fixed TTI. The transmission of HARQ-ACK information may be not in response to a reception of a data transport block (TB); rather, the transmission can be in response to an actual or missed detection of TDD-ULDL-Adapt.

A periodicity for a TDD UL-DL configuration in a number of TTIs can also be expressed in a number of frames where, for example, a frame includes 10 TTIs and a periodicity is defined relative to a System Frame Number (SFN). For example, for a periodicity of an adaptation for a TDD UL-DL configuration of 40 TTIs or 4 frames, an adaptation can occur at frame 0, frame 4, frame 8, and so on (unless an effective timing is also applied as further discussed below).

In a first approach, 'ConfigureTDD-ULDL-Adapt' also configures to a UE a transmission of UE-common or UE-group-common DL signaling for adapting a TDD UL-DL configuration (TDD-ULDL-Adapt) by providing one or more of the following parameters:

A periodicity of TDD-ULDL-Adapt that can be defined as a number of TTIs or frames between successive transmissions of TDD-ULDL-Adapt.

A number of transmissions for TDD-ULDL-Adapt and respective TTIs within one period (number of TTIs) of a TDD UL-DL configuration. For example, within a period of 40 TTIs where a TDD UL-DL configuration remains the same, TDD-ULDL-Adapt can be transmitted one time (such as at the thirty-first TTI), two times (such as at the twenty-first TTI and the thirty-first TTI), and so on.

A resource allocation for a TDD-ULDL-Adapt transmission including a number and location of CCEs in a CSS. For example, TDD-ULDL-Adapt can be transmitted using the first eight CCEs (in a logical domain prior to interleaving) of a CSS.

A type of DCI format used to transmit TDD-ULDL-Adapt. For example, a DCI format with a size equal to DCI format 1C or equal to DCI format 3/3A/0/1A.

An effective timing of an adapted TDD UL-DL configuration.

A TDD-RNTI used to scramble the CRC of a respective DCI format conveyed by TDD-ULDL-Adapt.

Throughout this disclosure, unless otherwise explicitly mentioned, a DCI format for transmitting TDD-ULDL-Adapt and having a size equal to DCI format 1C or any of DCI formats 3/3A/0/1A is respectively referred to for brevity as DCI format 1C or DCI format 3/3A/0/1A. It should be understood that this is not a respective conventional DCI format 1C or any of the conventional DCI formats 313A/0/1A.

Some of the above parameters can be defined in a system operation and need not be included in a 'ConfigureTDD-ULDL-Adapt' information element. For example, a DCI format with a size equal to DCI format 1C and with CRC scrambled with a TDD-RNTI can be a default choice for transmitting TDD-ULDL-Adapt. Additionally or alternatively, a UE can be configured to monitor a DCI format with a size equal to either DCI format 1C or DCI format 3/3A/0/1A. Additionally or alternatively, a UE can decode in every applicable TTI both DCI formats with a size equal to DCI format 1C and DCI format 3/3A/0/1A and select one having a successful CRC check, assuming that the CRC is scrambled with a configured TDD-RNTI. An effective timing of an adapted TDD UL-DL configuration can be predefined to be the first TTI after a number of TTIs where a TDD UL-DL configuration is the same. Additionally or alternatively, an effective timing of an adapted TDD UL-DL configuration can also be provided by TDD-ULDL-Adapt and can be for a current period of TDD-ULDL-Adapt or for a next period of TDD-ULDL-Adapt as it is subsequently described.

A number of transmissions for TDD-ULDL-Adapt can be from one or more than one, and the UE can then decode a respective DCI format in each applicable TTI (a TTI that can support DL transmissions). Several approaches are described below for a UE to determine TTIs for decoding TDD-ULDL-Adapt. Any approach or their combinations can be used in a system deployment to define a UE behavior in determining TTIs for decoding TDD-ULDL-Adapt or an eNB behavior in determining TTIs for transmitting TDD-ULDL-Adapt. DL TTIs and special TTIs where TDD-ULDL-Adapt can be transmitted are jointly referred as DL TTIs.

In a first approach, a starting DL TTI for TDD-ULDL-Adapt can be implicitly determined by a UE from the periodicity of TDD-ULDL-Adapt transmissions and from the number of TDD-ULDL-Adapt transmissions without additional configuration from the 'ConfigureTDD-ULDL-Adapt' information element. For example, for a periodicity of P frames and a number N of TDD-ULDL-Adapt transmissions, a starting DL TTI can be determined as the first TTI in the P-N frame (where P frames are indexed as 0, 1, ..., P−1). Alternatively, a starting TTI for a TDD-ULDL-Adapt transmission may not be defined, and a UE can attempt detection of a respective DCI format with CRC scrambled with a UE-configured TDD-RNTI in any TTI that can support DL transmissions (DL TTI or special TTI).

As an extension of the first approach, a number of TTIs between two consecutive transmissions of TDD-ULDL-Adapt for the same adaptation of a TDD UL-DL configuration can be signaled in 'ConfigureTDD-ULDL-Adapt' to a UE; the number of TTIs is denoted as B. The number B can be 0, 5, or 10, or other multiples of 5 and can be signaled or specified. When B=0, if there are multiple TDD-ULDL-Adapt transmissions, the transmissions can all be in one TTI.

If B>0, a starting TTI for the TDD-ULDL-Adapt transmissions can be determined as the TTI index within a period (10* P−B*N)+F, where the TTIs are indexed within a period as 1, 2, ..., 10*P, and F can be (for example) 1 or 2. As an example, within a period of 40 TTIs where a TDD UL-DL configuration remains same, TDD-ULDL-Adapt can be transmitted two times at a 31st TTI and a 36th TTI (with P=4, N=2, B=5, F=1), or two times at a 21st TTI and a 31st TTI (with P=4, N=2, B=10, F=1), and so on. As a further extension, a starting TTI for the TDD-ULDL-Adapt transmissions can be determined as the TTI index within a period (10*P−B*N)+F−T, where T can be an offset relative to the last TTI of the period of adaptation and can be a multiple of 5. When B=0, T could be a number no less than 5.

In a second approach, a starting DL TTI for a TDD-ULDL-Adapt transmission and a number of respective repetitions can be explicitly specified. For example, for a given periodicity of an adaptation of a TDD UL-DL configuration, a starting DL TTI can be a first TTI in a last frame of a TDD UL-DL configuration before adaptation. In case there are repetitions, the repetitions can be in a second TTI, a sixth TTI, or a seventh TTI of a last frame. Therefore, for a periodicity of 40 TTIs, a starting DL TTI for the TDD-ULDL-Adapt transmission can be the first TTI in the fourth frame (such as the 31st TTI), and if repetitions are also configured they can occur at the 32nd TTI, the 36th TTI, or the 37th TTI. For example, a starting DL TTI can be a first DL TTI of a TDD UL-DL configuration before adaptation. A reason for transmitting TDD-ULDL-Adapt in a last frame of a TDD UL-DL configuration before adaptation is because an eNB is unlikely to be able to determine an adapted TDD UL-DL configuration before the last frame as, otherwise, a shorter adaptation period could have been selected. Therefore, unnecessary attempts by a UE to decode TDD-ULDL-Adapt can be avoided, thereby reducing a probability that the UE incorrectly determines a DCI format as conveying TDD-ULDL-Adapt due to a CRC test being falsely positive.

In a third approach, all TTIs of a TDD-ULDL-Adapt transmission can be explicitly signaled by 'ConfigureTDD-ULDL-Adapt'. For example, only TTIs indicated as having a DL direction (DL TTIs or special TTIs) in a conventional TDD UL-DL configuration can be considered as it is subsequently illustrated. Further consider that there is a maximum of four such TTIs common to all TDD UL-DL configurations (first/second/sixth/seventh DL TTIs as in TABLE 1 if TDD UL-DL configuration 0 is included) or five such TTIs common to all TDD UL-DL configurations (excluding TDD UL-DL configuration 0). For a periodicity of P frames, a bitmap of 10P/4 or 10P/5 bits, respectively, can indicate the DL TTIs, where TDD-ULDL-Adapt is transmitted in each period of P frames.

In a fourth approach, the same TDD-ULDL-Adapt can be transmitted in the same TTI more than once. For example, a first eight CCEs can be used in a UE-CSS in a first transmission, and a second eight CCEs can be used in a second transmission in the same UE-CSS. The TTIs can be determined as in any of the previous three approaches.

In a fifth approach, the same TDD-ULDL-Adapt can be transmitted in any DL TTI of a conventional TDD UL-DL configuration. A UE detecting a TDD-ULDL-Adapt assumes that a respective signaled TDD UL-DL configuration applies as determined by the configured periodicity for an adaptation of a TDD UL-DL configuration. A reason for transmitting TDD-ULDL-Adapt in any DL TTI (including special TTI) of a conventional TDD UL-DL configuration is to provide an eNB with maximum flexibility in selecting TTIs for transmitting TDD-ULDL-Adapt.

For a UE configured with DL CA, a PCell using Frequency Division Duplexing (FDD) and a TDD SCell where the UE is also configured for operation with an adapted TDD UL-DL configuration, the transmission of TDD-ULDL-Adapt can be in the FDD PCell and it can either be in TTIs as determined by a conventional TDD UL-DL configuration in the TDD SCell or in every TTI of the FDD PCell. The former approach (TTIs as determined by a conventional TDD UL-DL configuration in the TDD SCell) can allow for a same RRC signaling, such as a bitmap size, for indicating to a UE the TTIs to receive TDD-ULDL-Adapt. The latter approach (every TTI of the FDD PCell) provides increased flexibility to an eNB to select TTIs to transmit TDD-ULDL-Adapt but, in principle, requires a larger bitmap size than for the former approach as more TTIs need to be indicated. For example, a bitmap size of 8 bits can be used with the former approach (to indicate up to 8 DL TTIs in a frame assuming that TDD UL-DL configuration 5 is not used as a conventional TDD UL-DL configuration) while a bitmap size of 10 bits can be used with the latter approach.

For a UE configured with DL CA, a TDD PCell and a TDD SCell where the UE is also configured for operation with an adapted TDD UL-DL configuration, the transmission of ULDL-Adapt can be in the TDD PCell and can be in TTIs determined by a conventional TDD UL-DL configuration in the TDD PCell.

An effective timing of an adapted TDD UL-DL configuration can also be adjusted by a timer with a value indicating an additional number of TTIs after which an adaptation of a TDD DL-UL configuration becomes effective. In that sense, an effective timing for an adapted TDD UL-DL configuration is an offset relative to a higher layer configured periodicity of an adaptation for a TDD UL-DL configuration. The effective timing can also be implicitly determined based on the DL TTI in which a UE detects a TDD-ULDL-Adapt. For example, if the DL TTI is the first DL TTI in a period of P frames, the TDD-ULDL-Adapt is applicable for the same period of P frames; otherwise, it is applicable for the next period of P frames.

After a UE receives a higher-layer signaling for an information element 'ConfigureTDD-ULDL-Adapt', the UE can decode TDD-ULDL-Adapt. If multiple transmissions of TDD-ULDL-Adapt exist within a period of an adaptation of a TDD UL-DL configuration and a first detection of TDD-ULDL-Adapt fails, a UE can perform soft combining among all respective received TDD-ULDL-Adapt (the UE assumes the same content for each TDD-ULDL-Adapt), if they are transmitted at resources already known to the UE as determined from 'ConfigureTDD-ULDL-Adapt'. For example, 'ConfigureTDD-ULDL-Adapt' can inform a UE of a 40 TTIs periodicity for a TDD UL-DL configuration, of a twenty-first TTI in the 40 TTIs for an initial transmission of a TDD-ULDL-Adapt, and of a 10 msec transmission periodicity for TDD-ULDL-Adapt. Assuming the use of predetermined CCEs for each such TDD-ULDL-Adapt transmission, a UE that does not detect the TDD-ULDL-Adapt in the twenty-first TTI can perform soft combining of the TDD-ULDL-Adapt with the same TDD-ULDL-Adapt in the thirty-first TTI before attempting another detection. Alternatively, if a UE detects multiple TDD-ULDL-Adapt in the same adaptation period of a TDD UL-DL configuration, the UE can consider as valid only the last TDD-ULDL-Adapt (if respective contents of the multiple TDD-UL-DL-Adapt are different).

TABLE 3 lists an example set of parameters included in a 'ConfigureTDD-ULDL-Adapt' information element.

TABLE 3

Example Parameters for a 'ConfigureTDD-ULDL-Adapt' Information Element

| | Size (bits) | Information |
|---|---|---|
| Periodicity of TDD-ULDL-Adapt | 3 | '000': 10 TTIs, starting with a frame with SystemFrameNumber mod 10=0<br>'001': 20 TTIs, starting with a frame with SystemFrameNumber mod 20 =0<br>'010': 40 TTIs, starting with a frame with SystemFrameNumber mod 40 =0<br>'011': 80 TTIs, starting with a frame with SystemFrameNumber mod 80 =0<br>'100': 160 TTIs, starting with a frame with SystemFrameNumber mod 160=0<br>'101': 320 TTIs, starting with a frame with SystemFrameNumber mod 320 =0<br>'110': 640 TTIs, starting with a frame with SystemFrameNumber mod 640 =0<br>'111': reserved |
| Number of transmissions of TDD-ULDL-Adapt | 2 | '00': 1<br>'01': 2<br>'10': 4<br>'11': 8 |
| CCEs for PDCCH conveying DCI format for TDD-ULDL-Adapt | 1 | '0': First 4 CCEs in CSS<br>'1': First 8 CCEs in CSS |
| Timer for effective timing of new TDD UL-DL configuration | 2 | '00': timer value 0<br>'01': timer value is 5 TTIs<br>'10': timer value is 10 TTIs<br>'11': timer value is 15 TTIs |

As previously discussed, it is also possible for the 'ConfigureTDD-ULDL-Adapt' information element to include only a subset of the parameters in TABLE 3, such as only the "Periodicity of TDD-ULDL-Adapt" parameter (which is equivalent to a periodicity of an adaptation for a TDD UL-DL configuration). For example, a UE can decode a TDD-ULDL-Adapt in every TTI that can support DL transmissions in an adaptation period, assuming that a respective DCI format can have a size of DCI format 1C or DCI format 0/1A/3/3A and is transmitted in a CSS. The UE can determine an effective timing for a new TDD UL-DL configuration based on a DL TTI where the DCI format is detected.

Figure 6:
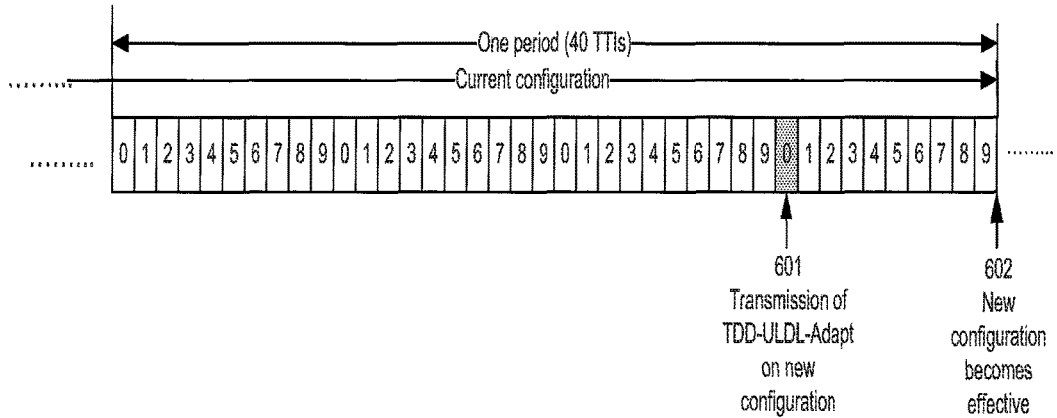
FIGS. 6 through 8 illustrate example configurations for transmitting TDD-ULDL-Adapt and an effective timing for an adapted TDD UL-DL configuration according to this disclosure.
Figure 7:
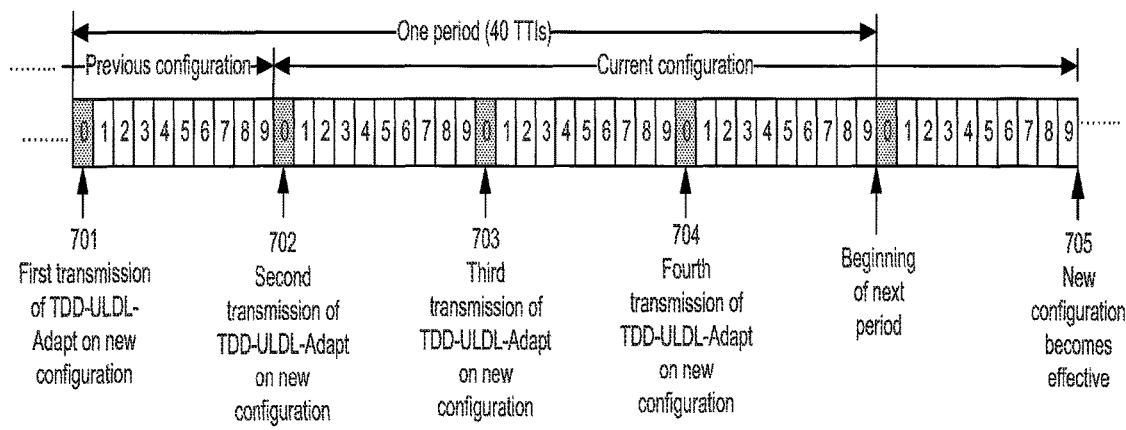
Figure 8:
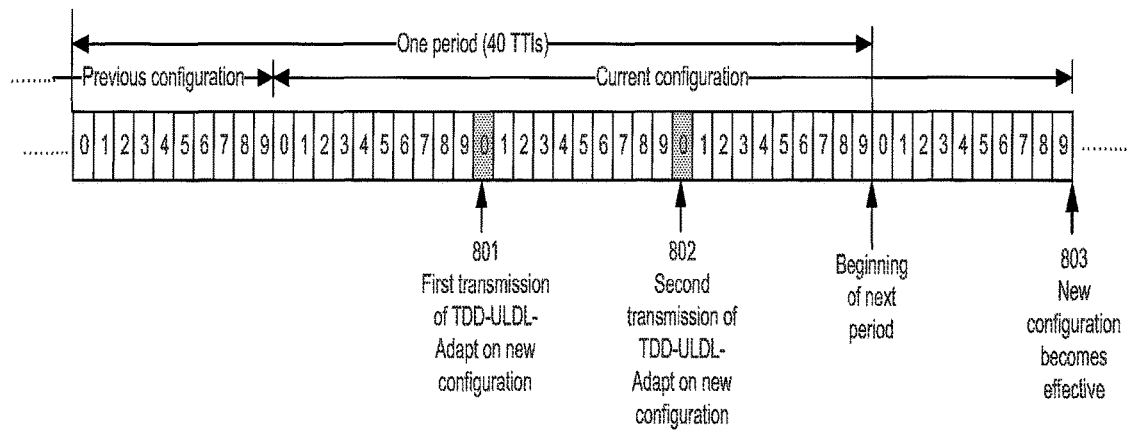

FIGS. 6 through 8 illustrate example configurations for transmitting TDD-ULDL-Adapt and an effective timing for an adapted TDD UL-DL configuration according to this disclosure. The configurations shown in FIGS. 6 through 8 are for illustration only. Other configurations can be used without departing from the scope of this disclosure.

As shown in FIG. 6, a periodicity for a TDD UL-DL configuration is 40 TTIs. An eNB transmits TDD-ULDL-Adapt one time at the 31st TTI in a period of 40 TTIs, as indicated at 601. The adapted TDD UL-DL configuration becomes effective immediately after the 40 TTIs as indicated at 602.

As shown in FIG. 7, a periodicity for a TDD UL-DL configuration is 40 TTIs. An eNB transmits TDD-ULDL-Adapt four times in a period of 40 TTIs as indicated at 701-704. An adapted TDD UL-DL configuration is effective 10 TTIs after 40 TTIs as indicated at 705. If TDD-ULDL-Adapt is detected in the first transmission of a TDD UL-DL configuration period, it is applicable to the same period; otherwise, it is applicable to the next period.

As shown in FIG. 8, a periodicity for a TDD UL-DL configuration is 40 TTIs. An eNB transmits TDD-ULDL-Adapt two times in a period of 40 TTIs in the 21st and 31st TTIs, respectively, as indicated at 801-802. An adapted TDD UL-DL configuration is effective 10 TTIs after 40 TTIs as indicated at 803.

Although FIGS. 6 through 8 illustrate examples of configurations for transmitting TDD-ULDL-Adapt, various changes may be made to FIGS. 6 through 8. For example, a transmission of TDD-ULDL-Adapt is only shown on the first TTIs of some respective frames but can be in additional DL TTIs (including special TTIs). In FIGS. 7 and 8, transmissions of TDD-ULDL-Adapt are only shown to be 10 TTIs apart. However, transmissions of TDD-ULDL-Adapt can also be on specific TTIs of a specific frame, such as the first, second, sixth, or seventh TTIs of a last frame in a number of frames defining the periodicity for an adaptation of a TDD UL-DL configuration. Alternatively, transmissions of TDD-ULDL-Adapt can be in the same DL TTI of a frame, or they can be in any DL TTI of a conventional TDD UL-DL configuration.

Figure 9:
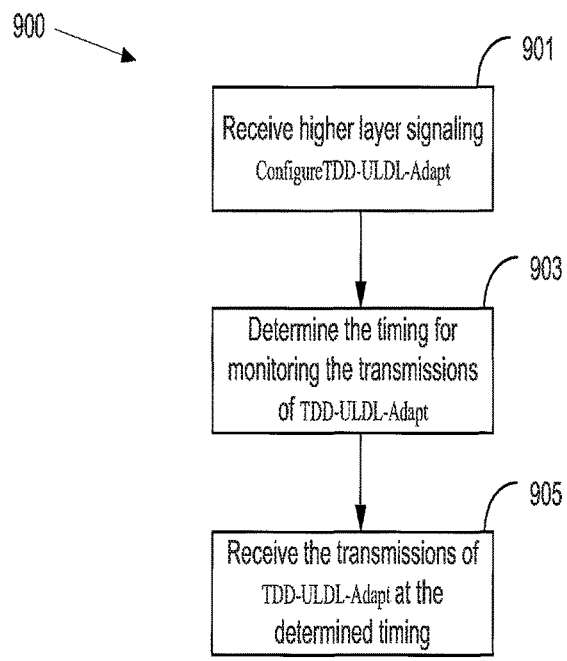
FIG. 9 illustrates an example method for a UE to acquire TDD-UPDL-Adapt according to this disclosure.

FIG. 9 illustrates an example method 900 for a UE to acquire TDD-UPDL-Adapt according to this disclosure. The embodiment of the method 900 shown in FIG. 9 is for illustration only. Other embodiments of the method 900 could be used without departing from the scope of this disclosure.

Referring to FIG. 9, at step 901, a UE receives higher-layer signaling of information element 'ConfigureTDD-ULDL-Adapt'. At step 903, the UE determines a timing (TTIs) and resources (CCEs) for monitoring a transmission of a TDD-ULDL-Adapt based on the received higher-layer signaling. For example, ConfigureTDD-ULDL-Adapt indicates that TDD-ULDL-Adapt transmission occurs every four frames and indicates the TTIs (that support DL transmissions) of a conventional configuration where TDD-ULDL-Adapt is transmitted to the UE (combination of the second, third, and fifth previous approaches). At step 905, the UE receives transmissions of TDD-ULDL-Adapt at the determined timing and resources. For example, the determined resources may be in a CSS. As another example, the determined resources may depend on a respective TTI and be UE-specific resources.

A UE can be activated or deactivated according to an adaptation of a TDD UL-DL configuration in a UE-specific manner by higher-layer signaling. For example, a UE that has no data to transmit or receive can be deactivated by an adaptation of a TDD UL-DL configuration and go into a "sleep" mode (also referred to as DRX). This can be, for example, when a UE is in an RRC_IDLE mode or DRX in RRC_CONNECTED mode. When a UE establishes communication with an eNB, the eNB can determine whether to configure the UE for operation with an adaptive TDD UL-DL configuration based, for example, on the data traffic demand for the UE. If the eNB configures a UE for operation with an adaptive TDD UL-DL configuration, the eNB can also configure the related parameters as previously described (that is, a TDD-RNTI, a periodicity for an adaptation of a TDD UL-DL configuration, and the like) and this configuration of ConfigureTDD-ULDL-Adapt can also implicitly serve as activation for operation with an adaptive TDD UL-DL configuration.

Another option for an eNB to indicate whether it applies an adaptation of a TDD UL-DL configuration is to transmit a respective indication (such as using a one-bit indicator) in a broadcast channel conveying system information. For example, the broadcast channel can be a primary broadcast channel a UE detects after synchronizing to an eNB or a channel providing a SIB associated with communication parameters a UE uses in order to continue communicating with an eNB. It is noted that, in some embodiments, only UEs capable of supporting an adaptation of a TDD UL-DL configuration may be able to identify this indication (the one-bit indicator).

A paging signal can also be sent to a UE to indicate that there is an adaptation of a TDD UL-DL configuration. The UE that receives such a paging signal can begin to monitor the PDCCHs conveying a DCI format providing the TDD-ULDL-Adapt.

If a UE is deactivated in an operation with an adapted TDD UL-DL configuration and is in a "sleep" mode, the UE can use a conventional TDD UL-DL configuration. Unless UEs operating with an adapted TDD UL-DL configuration consider TTI#6 according to a conventional TDD UL-DL configuration with respect to reception of UE-common information, an eNB may not transmit broadcast-related operations (such as P-RNTI (for paging), SI-RNTI (for system information), or RA-RNTI (for random access)) in TTI#6 in TABLE 1 if it is a special TTI in a conventional TDD UL-DL configuration but a regular DL TTI in an adapted TDD UL-DL configuration, as UEs not configured for operation with an adapted TDD UL-DL configuration assume it is a special TTI. If a UE knows that an eNB applies adaptive TDD UL-DL configuration, the UE may not need to monitor broadcast-related information (such as PDCCH with P-RNTI, SI-RNTI, and RA-RNTI) in TTI#6 if it is a special TTI in the conventional TDD UL-DL configuration.

DCI Format Detection and Parameters for Adapting a TDD UL-DL Configuration

In this embodiment, a UE-common DCI format for providing block information elements for adapting a TDD UL-DL configuration (conveyed by a PDCCH referred to as TDD-ULDL-Adapt) can be, for example, either DCI format 1C or DCI format 0/1A/3/3A. A CRC field included in the DCI format can be scrambled with a new RNTI type, TDD-RNTI, which can be used to indicate to a UE that the DCI format provides an adaptation of a TDD UL-DL configuration and is not intended for a respective conventional functionality. A use of a TDD-RNTI can also prevent UEs not capable of operating with an adapted TDD UL-DL configuration from detecting the DCI format (as they are assumed to not descramble the CRC field of the DCI format using the TDD-RNTI and are therefore not able to detect the DCI format).

Information fields in a DCI format adapting a TDD UL-DL configuration can include at least one of:
- An indicator for an adapted TDD UL-DL configuration;
- SRS configuration;
- Configuration of $P_{O\_PUSCH}$, $\alpha$, or $\delta_{PUSCH}$ for power control;
- CSI-RS configuration (such as ZP CSI-RS resource configuration in DL flexible TTIs);
- DL Flexible TTIs for periodic CSI (P-CSI) or aperiodic CSI (A-CSI) computation by a UE (such as a field including a bitmap to indicate which DL flexible TTIs a UE can use to compute a first type of a P-CSI or of an A-CSI and a second type of a P-CSI or of an A-CSI);
- UL flexible TTIs for UL power control (such as a field including a bitmap to indicate UL flexible TTIs a UE can transmit using a first UL PC process or a second UL PC process);
- CRS power offset in DL flexible TTIs (such as a CRS transmission power offset in a DL flexible TTI relative to a DL fixed TTI, if CRS is transmitted in DL flexible TTIs in case the DL flexible TTI is not configured to the UE as a Multicast-broadcast single-frequency network (MBSFN) TTI); and Effective timing of adapted TDD UL-DL configuration.

TABLE 4 lists indicative example values for a number of bits for each of the above information fields.

TABLE 4

Information fields in a DCI format adapting a TDD UL-DL configuration

| | Size (bits) | Information |
|---|---|---|
| UL-DL configuration | 3 | Adapted TDD UL-DL configuration |
| SRS configuration | 2 | SRS BW Configuration and SRS TTIs |
| Configuration of $P_{O\_PUSCH}$ and α for UL PC | 2 | One of up to four values for { $P_{O\_PUSCH}$, α} values configured to a UE by higher-layer signaling |
| Configuration of $δ_{PUSCH}$ for for UL PC | 1 | One of two predetermined sets of $δ_{PUSCH}$ values |
| Configuration of CSI-RS in flexible TTIs | 2 | One of up to four configurations of ZP CSI-RS in flexible TTIs configured to UEs by higher-layer signaling |
| Flexible DL TTIs for P-CSI or A-CSI | 5 | A bitmap indicating flexible DL TTIs a UE can use to compute a P-CSI or an A-CSI |
| Flexible UL TTIs for UL PC | 5 | A bitmap indicating flexible UL TTIs a UE can transmit using a first UL PC process or a second UL PC process |
| CRS power offset | 2 | CRS power offset for DL flexible TTIs relative to DL fixed TTIs |

For an UL-DL TDD configuration, although seven such configurations exist, certain restrictions can apply for an adaptation from one TDD UL-DL configuration to another as it was previously discussed. Also, a number of useful bits for indicating an adapted TDD UL-DL configuration can be reduced from three to two (an adaptation of a given TDD UL-DL configuration can be to only four TDD UL-DL configurations or some TDD UL-DL configurations, such as configuration 0 and 6, may not be used for adaptation) or one. For the SRS configuration, including a SRS BW configuration and SRS transmission TTIs, a subset of a set of possible values can be indicated as a total number of SRS BW configurations can be indicated with two bits, and a total number for SRS transmission TTI combinations can also be indicated with two bits.

For $P_{O\_PUSCH}$ four values can be configured in advance to UEs by higher-layer signaling (for use at least in some UL flexible TTIs), and one value can be indicated by a respective field in a DCI format for adaptation of TDD UL-DL configuration. For α, a subset of possible values can be configured in advance to UEs by higher-layer signaling (for use at least in some UL flexible TTIs), and one value can be indicated by a respective field in a DCI format for adaptation of TDD UL-DL configuration. For $δ_{PUSCH}$, an indication can be whether a UE should consider a TPC field of two bits in a DCI format scheduling a PUSCH as mapping to a first set of values (such as {−1, 0, 1, 3} dB) or mapping to a second set of values (such as {−5, −2, 2, 5} dB).

For ZP CSI-RS configurations in DL flexible TTIs, one of four possible configurations can be indicated using two bits.

A UE can also determine two types of P-CSI or A-CSI: a first type for DL TTIs where interference is mainly from DL transmissions (DL-dominant), and a second type for DL TTIs where interference is mainly from UL transmissions (UL-dominant). DL TTIs for the first P-CSI or A-CSI type can include all DL fixed TTIs and some DL flexible TTIs, while DL TTIs for the second P-CSI or A-CSI type can include the remaining DL flexible TTIs. For example, as described in detail below, if for a DL flexible TTI a respective value for the bitmap is 0, a UE considers the DL flexible TTI for determining the first CSI type; otherwise, a UE considers the DL flexible TTI for determining the second CSI type. It is assumed that TTI#0, TTI#1, and TTI#5 are DL fixed TTIs (including fixed special TTI for TTI#1) and TTI#2 is an UL fixed TTI. Moreover, as TTI#6 is either a special TTI or a DL TTI, interference can be assumed to be mainly from DL transmissions at least for the purposes of PDCCH transmission.

UL flexible TTIs (where a UE transmits using a first UL Power Control (PC) process or a second UL PC process) can also be indicated using a bitmap, similar to the DL flexible TTIs for computation of a first P-CSI or A-CSI type or of a second P-CSI or A-CSI type.

Finally, if CRS is transmitted in DL flexible TTIs, its transmission power can be different than in DL fixed TTIs, and it can be signaled to a UE using a "CRS power offset" field in a DCI format conveyed by TDD-ULDL-Adapt. The functionality of each field in TABLE 4 is specifically described below.

The information fields in a DCI format adapting a TDD UL-DL configuration in TABLE 4 can be simplified as in TABLE 4A, where each respective size (in bits) is again merely one example. For example, a SRS configuration for a UE in a UL flexible TTI can be derived from one in an UL fixed TTI where, for example, all transmission parameters except a transmission bandwidth can be the same and the transmission bandwidth can be increased (when appropriate) to account for an absence of PUCCH transmissions in an UL flexible TTI. As another example, a ZP CSI-RS configuration in a respective DL flexible TTI can be also included in the information element 'ConfigureTDD-ULDL-Adapt'.

For instance, as described below, the same bitmap can indicate both DL flexible DL TTIs for computing CSI and UL flexible TTIs for applying one of two UL PC processes. Note that a CRS power offset does not need to be informed to a UE if a channel estimate for demodulation is obtained only within a respective DL flexible TTI (or a CRS transmission power in a DL flexible TTI can be same as in a DL fixed TTI). Alternatively, the information fields 'DL Flexible TTIs for P-CSI or A-CSI', 'UL Flexible TTIs for UL power control', and 'DL Flexible TTIs for P-CSI or A-CSI and UL Flexible TTIs for UL PC' can be provided by other signaling such as higher layer signaling.

TABLE 4A

Information fields in a DCI format adapting a TDD UL-DL configuration

| | Size (bits) | Information |
|---|---|---|
| UL-DL configuration | 3 | Adapted TDD UL-DL configuration |
| Configuration of $P_{O\_PUSCH}$ and α for power control | 2 | One of up to four values for { $P_{O\_PUSCH}$, α } values configured to a UE by higher-layer signaling |

TABLE 4A-continued

Information fields in a DCI format
adapting a TDD UL-DL configuration

| | Size (bits) | Information |
|---|---|---|
| Configuration of $\delta_{PUSCH}$ for power control | 1 | One of two predetermined sets of $\delta_{PUSCH}$ values |
| DL Flexible TTIs for P-CSI or A-CSI and UL Flexible TTIs for UL PC | 5 | A bitmap indicating both DL flexible TTIs a UE can use to compute a first CSI or a second CSI and UL flexible TTIs a UE can transmit using a first UL PC process or a second UL PC process |

DCI format 1C can be the DCI format with a smallest size that is decoded by a UE. It can be transmitted in a CSS with one of the largest CCE aggregation levels (4 or 8 CCEs) and therefore can have the highest detection reliability. Therefore, DCI format 1C is highly appropriate to also convey an adaptation of a TDD UL-DL configuration and, in addition to 3 bits for indicating an adapted TDD UL-DL configuration, it can also include other information fields from TABLE 4 or 4A. Remaining bits, if any, can be set to a predetermined value such as '0', which can be exploited by a UE to further reduce a probability of an inappropriate DCI format detection due to a false CRC check. The same functionality applies in case a DCI format with a size equal to DCI format 0/1A/3/3A is used to convey an adaptation of a TDD UL-DL configuration. DCI format 0/1A/3/3A has a larger size than DCI format 1C and can therefore convey more information related to an adaptation of a TDD UL-DL configuration but at a cost of somewhat reduced reliability. DCI format 0/1A has the same size as DCI format 3/3A and can be transmitted either in a CSS or in a UE-DSS.

Figure 10:
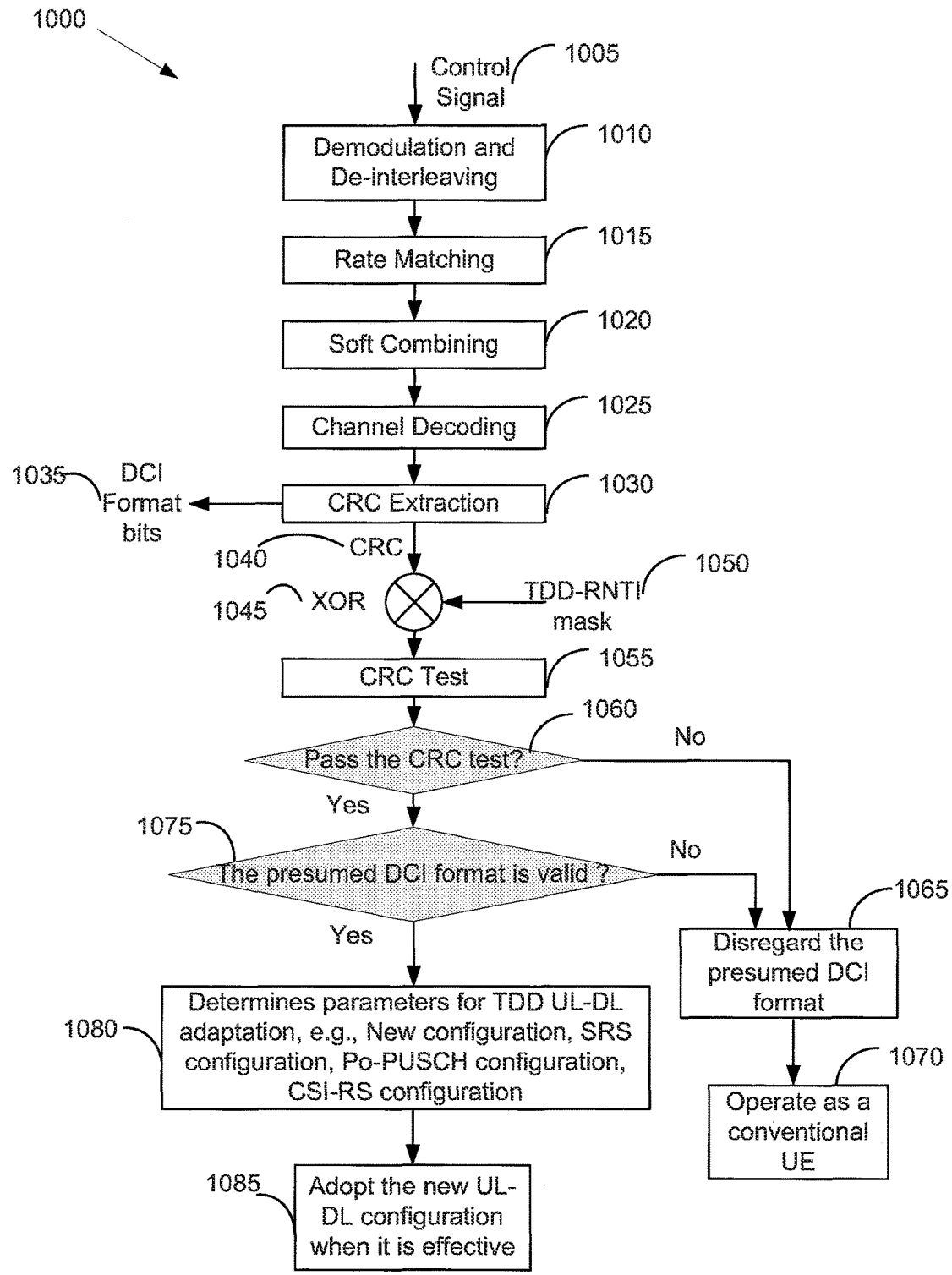
FIG. 10 illustrates an example method for a UE to detect a DCI format providing an adaptation of a TDD UL-DL configuration according to this disclosure.

FIG. 10 illustrates an example method 1000 for a UE to detect a DCI format providing an adaptation of a TDD UL-DL configuration according to this disclosure. The embodiment of the method 1000 shown in FIG. 10 is for illustration only. Other embodiments of the method 1000 could be used without departing from the scope of this disclosure.

Referring to FIG. 10, a received control signal 1005 is demodulated and the resulting bits are de-interleaved at operation 1010. A rate matching applied at an eNB transmitter is restored through operation 1015, and data is decoded at operation 1025 after being combined at operation 1020 with soft values of previous receptions of control signals conveying the same information (as previously described with respect to FIGS. 6 through 8). After decoding, DCI format information bits 1035 and CRC bits 1040 are separated at operation 1030, and CRC bits are de-masked at operation 1045 by applying an XOR operation with a TDD-RNTI mask 1050.

A UE performs a CRC test at operation 1055. At operation 1060, the UE determines whether it passes the CRC test. If the CRC test does not pass, at operation 1065, a UE disregards the presumed DCI format. The UE can then operate as a conventional UE at operation 1070. If the CRC test passes, at operation 1075, a UE determines whether the presumed DCI format is valid. For example, if in the DCI format some of the bits are predefined as '0' but in the presumed DCI format some of these bits are not '0', the UE determines the presumed DCI format is not valid. If all the bits are '0' (or the same as the predefined value), the UE determines the presumed DCI format is valid. If a UE determines the presumed DCI format is valid, at operation 1080, the UE determines parameters for an adapted TDD UL-DL configuration that may include, in addition to an adapted TDD UL-DL configuration, SRS configuration parameters such as a SRS BW configuration and SRS transmission TTIs, a $\{P_{O\_PUSCH}, \alpha\}$ configuration, a configuration of a CSI-RS process in flexible TTIs, and so forth. The UE can operate, in operation 1085, using an adapted TDD UL-DL configuration when it becomes effective.

If a UE determines the presumed DCI format corresponding to the received control signal 1005 is invalid, the UE disregards the presumed DCI format in operation 1065. The UE can operate 1070 as a conventional UE using a conventional TDD UL-DL configuration or, alternatively, follow a procedure such as in operation 1140 in FIG. 11 described below. If the UE is configured with a PUCCH resource to transmit HARQ-ACK information (DTX or ACK) regarding a detection of TDD-ULDL-Adapt, the UE can provide feedback to an eNB about failing to detect the DCI format. This can occur when the CRC test 1060 fails or the presumed DCI format test 1075 fails. The HARQ-ACK feedback can be provided by implicitly sending the eNB a DTX value (no actual HARQ-ACK signal transmission from the UE) during the operation 1070 or 1140. If the presumed DCI format is valid, the UE can send a HARQ-ACK signal with an ACK value to the eNB in operation 1080 or 1085.

The TDD-RNTI can be configured to a UE by higher-layer signaling in association with a configuration for operation with an adaptive TDD UL-DL configuration. Therefore, a TDD-RNTI can be UE-specific, and different TDD-RNTIs can be used for different UEs. For example, TDD-RNTI#1 can be used for a first group of UEs, and TDD-RNTI#2 can be used for a second group of UEs (where a group of UEs includes one or more UEs). As described below, a group of UEs can be determined according to respective dominant interfering cell(s). In this manner, some of the information fields in TABLE 4 (such as the UL-DL configuration field) can be UE-common, while other parameters (such as the DL flexible TTIs for CSI measurement or the UL flexible TTIs for use of a second UL power control process (other than a first UL PC process used in UL fixed TTIs)) can be UE-specific.

A PDCCH with a first TDD-RNTI can be transmitted in the same TTI or in a different TTI than a PDCCH with a second TDD-RNTI. This is also needed to address groups of UEs configured with DL CA and having a different number or different order of SCells using an adapted TDD UL-DL configuration. A PDCCH conveying a DCI format with a TDD-RNTI can be transmitted in a CSS (such as a DCI format with a size equal to DCI format 1C or to DCI format 0/1A/3/3A) or in a UE-DSS (such as by using DCI format 0/1A). Also, if not all respective UEs can detect a PDCCH conveying a DCI format with a first TDD-RNTI in the same TTI, the PDCCH can also be transmitted in additional TTIs, as previously described.

When DRX is configured for a UE and the UE is in DRX mode in TTIs where a TDD-ULDL-Adapt is transmitted in a current adaptation period of a TDD UL-DL configuration then, for a next adaptation period of a TDD UL-DL configuration, the UE can operate as a conventional UE using a conventional TDD UL-DL configuration. In general, a UE may not detect TDD-ULDL-Adapt (within an adaptation period for a TDD UL-DL configuration). Then, the UE can assume a conventional TDD UL-DL configuration for communication with an eNB in a respective cell. For example, a UE in RRC_IDLE can use a conventional TDD UL-DL configuration to monitor paging.

Figure 11:
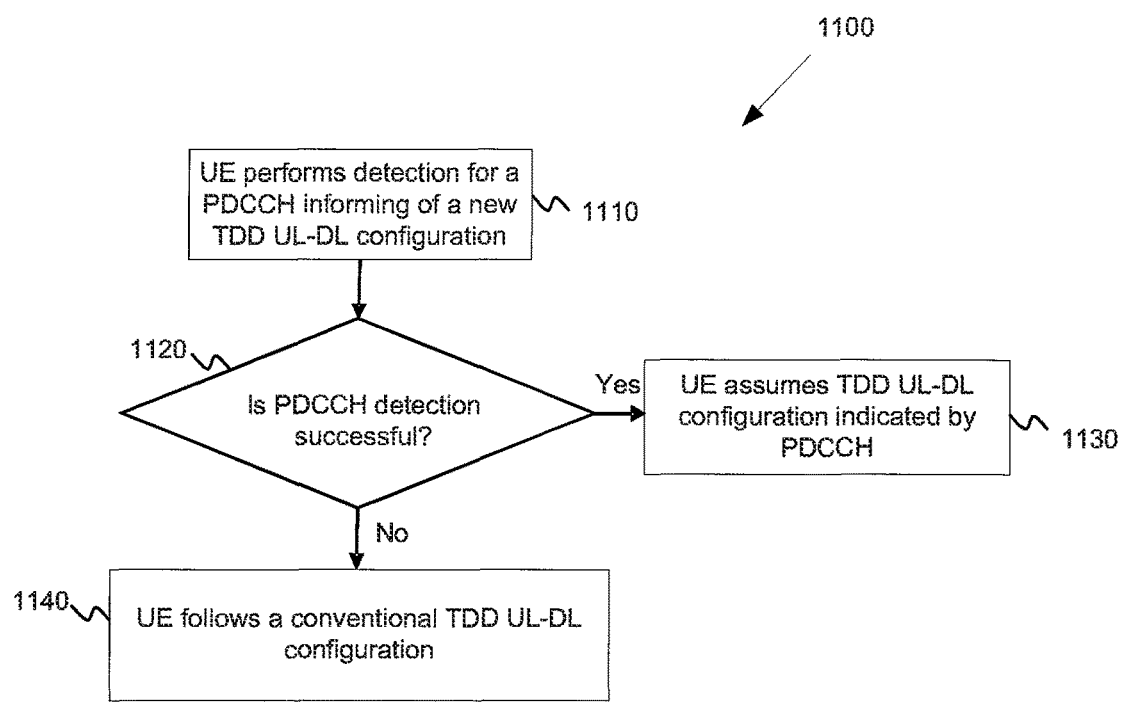
FIG. 11 illustrates an example method for a UE to operate after a TDD UL-DL configuration period according to this disclosure.

FIG. 11 illustrates an example method 1100 for a UE to operate after a TDD UL-DL configuration period according to this disclosure. In FIG. 11, the method 1100 depends on whether or not the UE detects TDD-ULDL-Adapt within the TDD UL-DL configuration period. The embodiment of the method 1100 shown in FIG. 11 is for illustration only. Other embodiments of the method 1100 could be used without departing from the scope of this disclosure.

Referring to FIG. 11, in operation 1110, a UE performs at least one decoding operation for TDD-ULDL-Adapt within a TDD UL-DL configuration period. In operation 1120, it is determined if the at least one decoding operation is successful (if TDD-ULDL-Adapt is detected). If the at least one decoding operation is successful, in operation 1130, the UE assumes the TDD UL-DL configuration indicated by TDD-ULDL-Adapt as the new (adapted) TDD UL-DL configuration. Otherwise, if it is not successful, in operation 1140, the UE follows a conventional TDD UL-DL configuration.

When DRX is configured for a UE, an eNB can transmit TDD-ULDL-Adapt in a UE-DSS (as described below) during the active time (such as during the on-duration of the UE's DRX cycle). This can be extended for a group of UEs having the same DRX cycle (using, for example, a respective UE-group common TDD-RNTI). Alternatively, when DRX is configured for a UE, the UE may have an additional wake up to receive at least one TDD-ULDL-Adapt. The UE's active time can be prolonged to receive at least one DCI format conveying TDD-ULDL-Adapt. Alternatively, when DRX is configured for a UE, the UE's DRX pattern can be adjusted so that the UE's on-duration in the DRX cycle coincides with at least one transmission of TDD-ULDL-Adapt (for example, a first TDD-ULDL-Adapt transmission can be at the beginning of the UE's on-duration). The adjustment can be per DRX cycle-based, such as when the on-duration is adjusted to an earlier time in a first cycle and the on-duration is adjusted to a later time in a second cycle.

If a UE does not detect within a TDD UL-DL configuration period a TDD-ULDL-Adapt, assuming the UE reports P-CSI for some DL flexible TTIs (as previously described), the UE can transmit an Out Of Range (OOR) indication for that P-CSI. In this manner, a UE can provide feedback to an eNB that the UE did not detect a PDCCH providing a TDD UL-DL reconfiguration. As a valid P-CSI for some DL flexible TTIs (second P-CSI of second P-CSI type) is likely to indicate a higher SINR than a P-CSI for DL fixed TTIs and remaining DL flexible TTIs (first P-CSI of second P-CSI type) since it captures UL interference that is typically lower than DL interference, an eNB can determine that an OOR indication in the second P-CSI indicates a missed detection of a TDD-ULDL-Adapt if the indication in the first P-CSI is not an OOR indication. For example, if the first P-CSI does not indicate OUR, an eNB can regard an OOR in a second P-CSI as if a respective UE did not detect a TDD-ULDL-Adapt and the eNB can have the same understanding as the UE for the fallback UE operation such as in operation 1140. If the first P-CSI indicates OUR, an eNB may either regard the OOR in the first and second P-CSIs as valid, or it may avoid scheduling that UE until it gets a P-CSI report not indicating OOR. Although the above embodiment is described with respect to P-CSI, the same functionality can apply for A-CSI.

UE-Dedicated DL Signaling for Adapting a TDD UL-DL Configuration

In this embodiment, a DL signaling providing information associated with an adaptation of a TDD UL-DL configuration (TDD-ULDL-Adapt) can be UE-specific (instead of being common for a group of UEs). This can allow UE specific parameters, such as a $P_{O\_PUSCH}$ value or a CSI-RS configuration, to be selected according to channel and interference conditions experienced by a UE. This can also allow a UE to provide HARQ-ACK feedback to an eNB regarding a detection (ACK) or miss (DTX) of TDD-ULDL-Adapt.

A DCI format for UE-dedicated signaling of TDD-ULDL-Adapt can be a DCI format that a UE monitors in a UE-DSS, such as DCI format 0/1A. The DCI format payload can include the information previously described with respect to UE-common TDD-ULDL-Adapt. In order to differentiate conventional PDSCH scheduling (DCI format 1A) or PUSCH scheduling (DCI format 0) from an adaptation of a TDD UL-DL configuration with DCI format 0/1A, certain fields in DCI format 0/1A can be set to have respective predetermined values, while the same C-RNTI can be used as for PDSCH or PUSCH scheduling in order to avoid reducing a number of available RNTIs.

An indicator for differentiating whether a DCI format 0/1A is for an adaptation of a TDD UL-DL configuration or for data scheduling can be explicit using one additional bit in an existing payload of DCI format 0/1A. For example, the indicator can be defined as a field 'Indicator for UL-DL configuration adaptation' and have one of the following values:
 '0': DCI format is for adaptation of a TDD UL-DL configuration; and
 '1': DCI format is for data scheduling.

An indicator for differentiating whether a DCI format 0/1A is for an adaptation of a TDD UL-DL configuration or for data scheduling can be implicit. For example, in DCI format 0 or in DCI format 1A, one or multiple fields can have respective predefined values. A UE can validate an adaptation of a TDD UL-DL configuration by checking the one or multiple fields with predefined values after a positive CRC test for a respective DCI format (DCI format 0 or DCI format 1A). Validation is achieved if all fields for the DCI format are set according to predefined values.

A UE can send a HARQ-ACK signal with an ACK value in response to a detection (including a validation as previously described) of a TDD-ULDL-Adapt conveying a UE-specific DCI format (DCI format 0 or DCI format 1A) or with a DTX value (no HARQ-ACK signal transmission) if the UE fails to detect (and validate) a TDD-ULDL-Adapt. If a UE successfully detects and validates TDD-ULDL-Adapt, the UE can use the signaled new TDD UL-DL configuration starting from its effective time. If a UE cannot detect or validate a TDD-ULDL-Adapt, the UE can fall back to operate assuming a conventional TDD UL-DL configuration.

When a UE-specific DCI format indicates an adaptation of a TDD UL-DL configuration, remaining fields in the DCI format (other than a field for differentiating a DCI format functionality for adaptation of a TDD UL-DL configuration from a functionality for scheduling PDSCH or PUSCH) can be used to deliver information for an adaptation of a TDD UL-DL configuration as described in TABLE 4. However, in this case, an eNB can set the values of each information field in a UE-specific manner.

Figure 12:
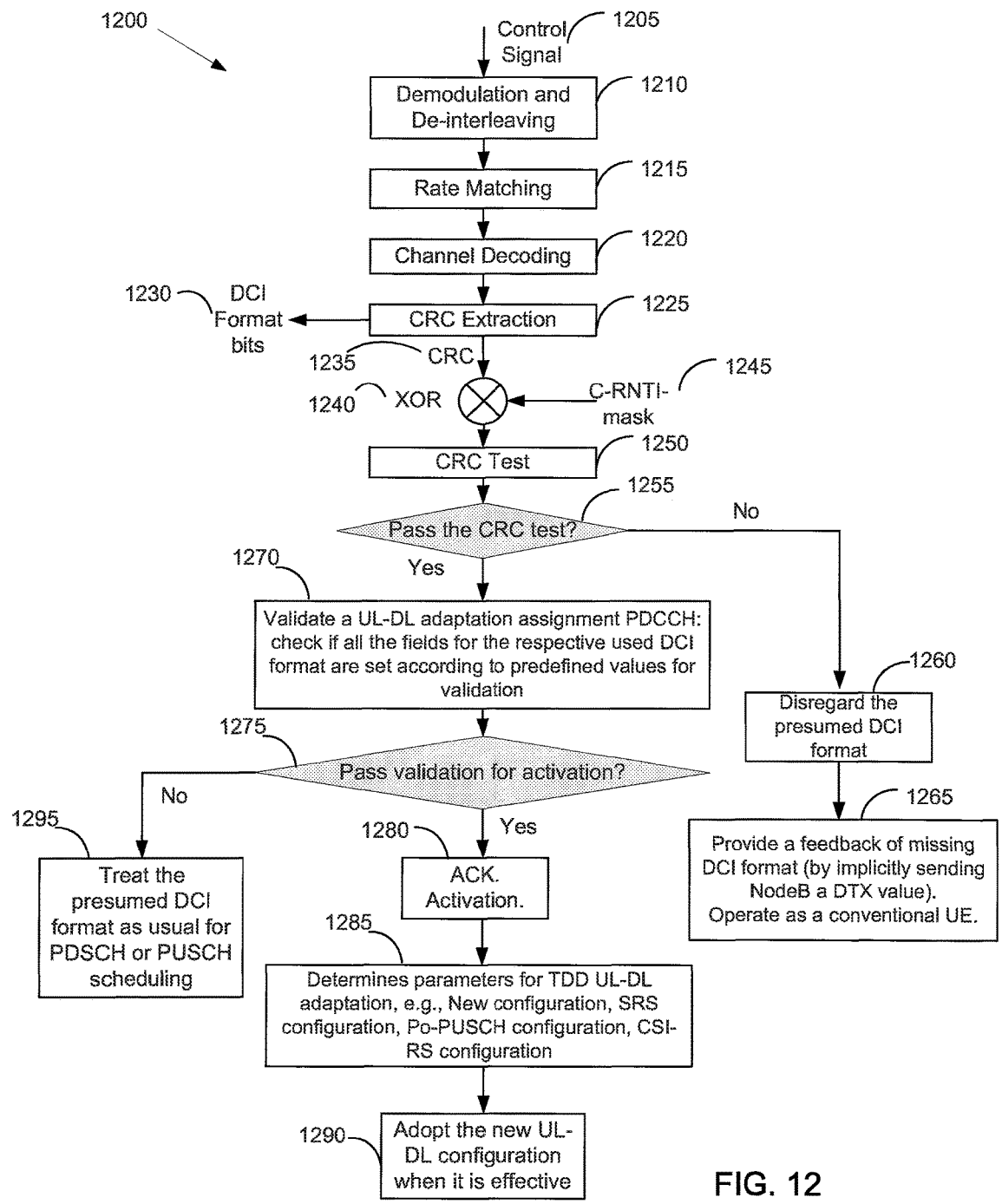
FIG. 12 illustrates an example method for a UE to detect, in a UE Dedicated Search Space (UE-DSS), a DCI format providing an adaptation of a TDD UL-DL configuration according to this disclosure.

FIG. 12 illustrates an example method 1200 for a UE to detect, in a UE-DSS, a DCI format providing an adaptation of a TDD UL-DL configuration according to this disclosure. The embodiment of the method 1200 shown in FIG. 12 is for illustration only. Other embodiments of the method 1200 could be used without departing from the scope of this disclosure.

Referring to FIG. 12, a received control signal 1205 is demodulated and resulting bits are de-interleaved at operation 1210. A rate matching applied at an eNB transmitter is restored through operation 1215, and data is decoded at operation 1220. After decoding, DCI format information bits 1230 and CRC bits 1235 are separated at operation 1225, and CRC bits are de-masked at operation 1240 by applying an XOR operation with a UE C-RNTI mask 1245.

A UE performs a CRC test at operation 1250. The UE determines whether it passes the CRC test at operation 1255. If the CRC test does not pass, the UE disregards the presumed DCI format at operation 1260, and the UE provides feedback to the eNB about not being able to detect the DCI format at operation 1265. The feedback could include implicitly sending the eNB a DTX value (no actual HARQ-ACK signal transmission from the UE). In this case, the UE continues to operate using a conventional TDD UL-DL configuration (similar to UEs that do not operate with an adapted TDD UL-DL configuration) if the UE does not receive any other signaling for adapting a TDD UL-DL configuration.

If the CRC test passes, in operation 1270, a UE further validates a DCI format for an adaptation of a TDD UL-DL configuration by checking whether all respective validation fields for a respective DCI format are set according to predefined values in operation 1275. If it does, in operation 1280, the UE can send a HARQ-ACK signal with an ACK value to the eNB and the UE determines parameters for an adapted TDD UL-DL configuration in operation 1285. The parameters include at least a new UL-DL configuration, and can also include one or more of SRS configuration parameters, such as a SRS BW configuration and SRS TTIs, a $\{P_{O\_PUSCH}, \alpha\}$ configuration, a configuration of CSI-IM resources in DL flexible TTIs, and so on. The UE can operate using an adapted TDD UL-DL configuration when it becomes effective in operation 1290. If the DCI format detection does not pass the validation test, the UE further considers the DCI format for PDSCH scheduling (if it is DCI format 1A) or PUSCH scheduling (if it is DCI format 0) and continues with conventional further processing of the DCI format in operation 1295.

Several combinations exist for setting the values of some information fields in a DCI format to predetermined ones, for indicating that the DCI format provides an adaptation of a DL-UL configuration, and for using values of remaining information fields to provide information associated with an adaptation of a TDD UL-DL configuration.

In a first approach, information fields in DCI format 0 and DCI format 1A can be set as described in TABLE 5. The entry "TDD configuration" indicates that respective bits provide information for an adaptation of a TDD UL-DL configuration, such as is described in TABLE 4.

TABLE 5

Values of Information Fields for a DCI format 0 or 1A providing an adaptation of a TDD UL-DL configuration

|  | DCI format 0 | DCI format 1A |
| --- | --- | --- |
| Resource Allocation | Set all bits to '1' | Set all bits to 1 |
| Modulation and coding scheme (and redundancy version for DCI format 0) | Set all bits to '0' | Set all bits to '0' |

TABLE 5-continued

Values of Information Fields for a DCI format 0 or 1A providing an adaptation of a TDD UL-DL configuration

|  | DCI format 0 | DCI format 1A |
| --- | --- | --- |
| TPC command for PUSCH (DCI format 0) or PUCCH (DCI format 1A) | TDD Configuration | TDD Configuration |
| Cyclic shift and Orthogonal Cover Code for DM RS | TDD Configuration | N/A |
| HARQ process number | N/A | TDD Configuration |
| Redundancy version | N/A | TDD Configuration |
| New Data Indicator | TDD Configuration | TDD Configuration |
| CSI request | TDD Configuration | N/A |
| Frequency Hopping Flag | TDD Configuration | TDD Configuration |
| Padding Bit | TDD Configuration | N/A |

In a second approach, an adaptation of a TDD UL-DL configuration is provided only by DCI format 0. For example, UEs configured for operation with an adapted TDD UL-DL configuration can interpret a value of '111' for the information field "Cyclic Shift and Orthogonal Cover Code for DM RS" as configuring an adaptation of a TDD UL-DL configuration. Those UEs can also interpret some of the bits of the remaining information fields as providing information for an adaptation of a TDD UL-DL configuration.

An effective timing for an adapted TDD UL-DL configuration can be configured by higher-layer signaling and can be included in the information element 'ConfigureTDD-ULDL-Adapt'. Alternatively, an effective timing for an adapted TDD UL-DL configuration can be included in the DCI format performing the adaptation of a TDD UL-DL configuration. For example, if the effective timing is configured by higher-layer signaling to be every 40 TTIs, a UE can know a TTI for applying an adapted TDD UL-DL configuration since the UE knows a respective TTI index. Similarly, if the effective timing is indicated by a DCI format (possibly with a multi-TTI, or frame, granularity in order to not require many bits), a UE can be directly informed of a TTI to apply a new TDD UL-DL configuration.

Figure 13:
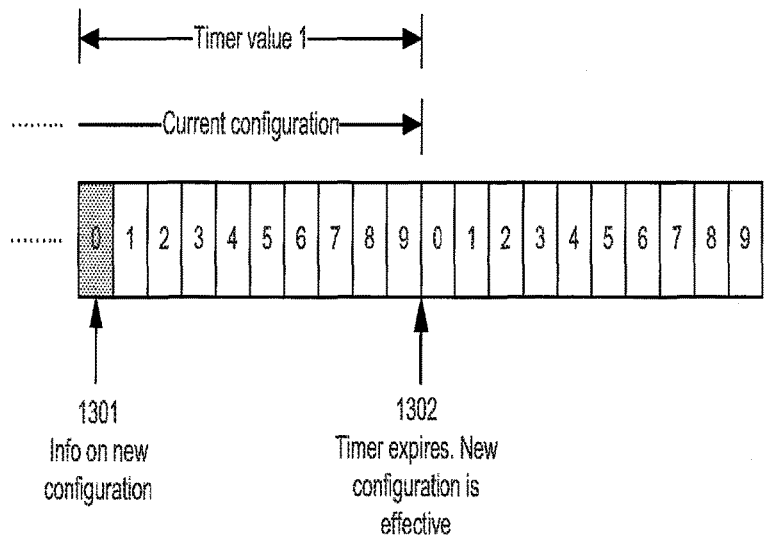
FIGS. 13 and 14 illustrate example transmissions of DL signaling TDD-ULDL-Adapt and effective timing of an adapted configuration according to this disclosure.
Figure 14:
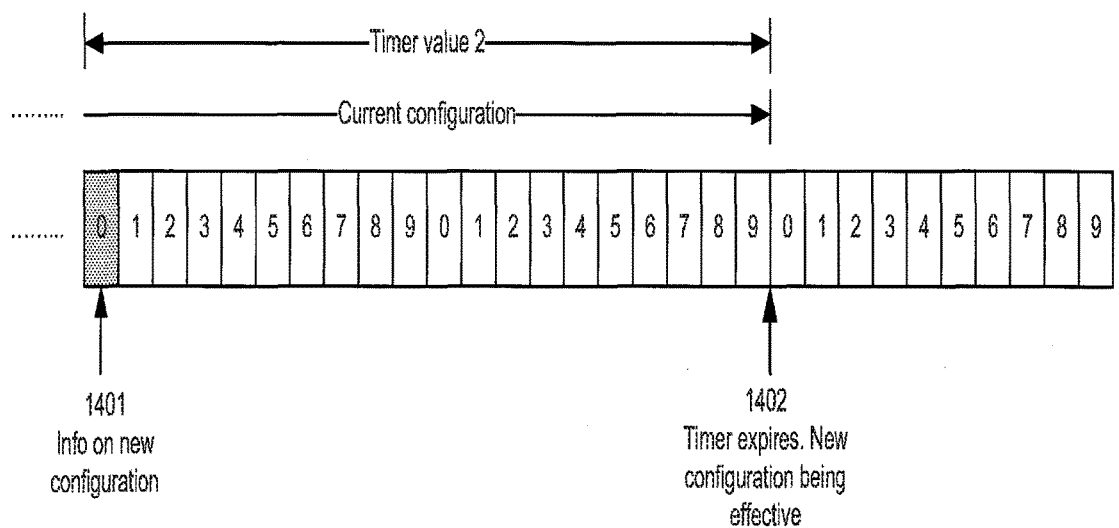

FIGS. 13 and 14 illustrate example transmissions of DL signaling TDD-ULDL-Adapt and effective timing of an adapted configuration according to this disclosure. The embodiments illustrated in FIGS. 13 and 14 are for illustration only. Other embodiments could be used without departing from the scope of this disclosure. As shown in FIG. 13, TDD-ULDL-Adapt is received in TTI#0 of a first frame as indicated at 1301, and a first timer value is 10 ms. Based on the first timer value, the adapted TDD UL-DL configuration is effective at the beginning of a second frame as indicated at 1302. As shown in FIG. 14, TDD-ULDL-Adapt is detected in TTI#0 of a first frame as indicated at 1401, and a second timer value is 20 ms. Based on the second timer value, the new configuration is effective at the beginning of a third frame as indicated at 1402. In both FIG. 13 and FIG. 14, a timer value can be indicated from a set of a values that were previously configured to a UE by higher-layer signaling or can be directly included in the DL signaling TDD-ULDL-Adapt.

When DRX is configured for a UE, an eNB can send a TDD-ULDL-Adapt in a UE-DSS during the active time of the UE (such as during the on-duration of the UE's DRX cycle). In general, if a UE does not detect a TDD-ULDL-Adapt within a TDD UL-DL configuration period, the UE can use a conventional TDD UL-DL configuration as described in FIG. 11.

Indication of DL TTIs for Measurements of a First CSI or a Second CSI or of UL TTIs for a First UL PC Process or a Second UL PC Process In this embodiment, a method for a UE to determine TTIs for measuring a first CSI and a second CSI is described. For brevity, the method is described only with respect to a generic CSI term and can apply to either P-CSI or A-CSI. A UE is assumed to measure a CSI for a first set of DL TTIs separately from a CSI for a second set of DL TTIs in an adapted TDD UL-DL configuration. Not all DL flexible TTIs are considered for determining a CSI, as a UE can experience DL-dominant interference in some DL flexible TTIs (similar to DL fixed TTIs) and experience UL-dominant interference in remaining DL flexible TTIs. An eNB, estimating a location of a UE and knowing a TDD UL-DL configuration used in a dominant interfering cell for the UE (this information can be exchanged among eNBs prior to an adaptation of a TDD UL-DL configuration), can inform the UE of the DL flexible TTIs to use for computing a respective CSI. A bitmap can be included in a DCI format conveyed by TDD-ULDL-Adapt to indicate to a UE DL flexible TTIs, per frame, the UE can use together with DL fixed TTIs for determining a first CSI and to indicate DL flexible TTIs the UE can use for determining a second CSI.

The bitmap can include all flexible TTIs within a frame as shown, for example, in TABLE 2. Therefore, a bitmap size can be equal to a number of flexible TTIs within a frame. A bitmap size containing actual information can be variable according to an indicated TDD UL-DL configuration as shown in TABLE 6. For example, if all configurations are possible for adaptation, a maximum bitmap size of five bits can be used if TTI#6 is assumed to have a same CSI as a DL fixed TTI. Otherwise, a maximum size of six bits is needed. As another example, if TDD UL-DL configurations 0 and 6 are not possible for adaptation, a maximum bitmap size of three bits can be used if TTI#6 is again assumed to have a same CSI as a DL fixed TTI. Otherwise, a maximum size of four bits is needed. The size of a field for indication of DL TTIs considered for CSI determination can be fixed (such as five bits or three bits). As a further optimization, if a smaller number of bits is required for the bitmap (depending, for example, on a conventional TDD UL-DL configuration and an adapted TDD UL-DL configuration) the bitmap can be placed first in the field and any remaining bits can be set to a predetermined value, such as a '0', resulting in a fixed total length of five bits or three bits.

Alternatively, a bitmap can correspond to a maximum number of flexible TTIs (across all possible TDD UL-DL configurations) and a respective value for a TTI that happens to be fixed based on a conventional TDD UL-DL configuration can be set to a predetermined value such as a value of '0'. Also, if a flexible TTI is an UL flexible TTI, a respective value in the bitmap can have a predetermined value, such as a value of '0'. After a UE determines an adapted TDD UL-DL configuration, it can determine an actual information size for the bitmap.

As an example, if TTI#3, TTI#4, TTI#7, TTI#8 and TTI#9 can be flexible TTIs and if in a current TDD UL-DL configuration all flexible TTIs except TTI#7 are DL TTI, a bitmap of {0, 1, 0, 1, 0}, with each bit corresponding to TTI#3, 4, 7, 8, and 9, respectively, can indicate that a UE should determine a second CSI for TTI#4 and TTI#8 and a first CSI for TTI#9. Alternatively the bitmap can be {0, 1, 1, 0, 0}, with the first four bits corresponding to the DL flexible TTIs (TTI#3, 4, 8, and 9) and the fifth bit corresponding to the UL flexible TTI (TTI #7).

If not all previous TTIs can be flexible TTIs (such as when TDD UL-DL configuration 1 is signaled by system information and TTI#4 and TTI#9 are DL fixed TTIs), a respective value in the bitmap can be predetermined, such as a value of '0'. In this case, an example bitmap signaled to a UE can be {1, 0, 0, 1, 0}, with each bit corresponding to TTI#3, 4, 7, 8, and 9, respectively, and the UE can determine a second CSI for TTI#3 and TTI#8 and a first CSI for TTI#9. Alternatively, the bitmap can be {1, 0, 1, 0, 0}, with the first three bits corresponding to the flexible TTIs (TTI#3, 7, and 8) and the fourth and fifth bits corresponding to the fixed TTIs (TTI #4 and 9). In another alternative, the bitmap can be {1, 1, 0, 0, 0}, with the first two bits corresponding to the DL flexible TTIs (TTI#3 and 8) and the last three bits corresponding to the fixed TTI or UL flexible TTIs (TTI #4, 7, and 9). If the value of an element in the bitmap is not consistent with a TDD UL-DL configuration signaled by system information, an associated DCI format can be regarded as invalid and a UE can disregard the DCI format conveyed by a detected TDD-ULDL-Adapt.

For each bit in the bitmap, a value of '1' can indicate a respective DL flexible TTI to be considered for a first CSI computation while a value of '0' can indicate a respective DL flexible TTI to be considered for a second CSI computation (or vice versa). The bitmap can be included in a DCI format conveyed by TDD-ULDL-Adapt. The TDD-ULDL-Adapt can be transmitted in a UE-DSS or a CSS. The same bitmap can be used for a group of UEs.

TABLE 6

Bitmap size for Flexible TTIs (F) for TDD UL-DL configurations

| TDD UL-DL Configuration | Bitmap size | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | F | F | D | F | F | F | F |
| 1 | 3 | D | S | U | F | D | D | F | F | F | D |
| 2 | 1 | D | S | U | D | D | D | F | F | D | D |
| 3 | 2 | D | S | U | F | F | D | D | D | D | D |
| 4 | 1 | D | S | U | F | D | D | D | D | D | D |
| 5 | n/a | D | S | U | D | D | D | D | D | D | D |
| 6 | 4 | D | S | U | F | F | D | F | F | F | D |

Figure 15:
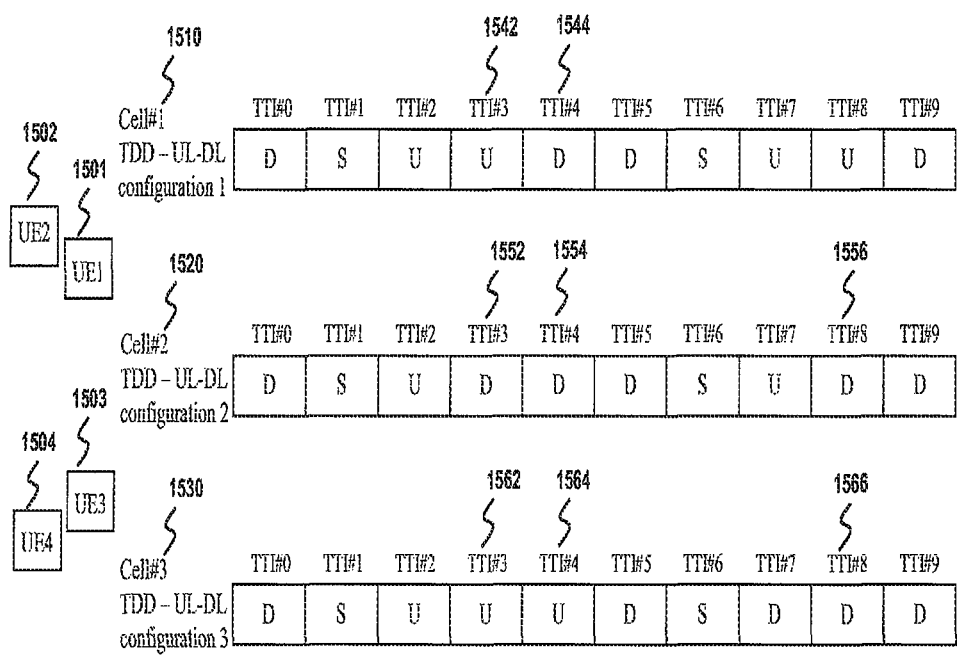
FIG. 15 illustrates an example indication of DL TTIs to a UE for determining two separate channel state information (CSI) reports according to this disclosure.

FIG. 15 illustrates an example indication of DL TTIs to a UE for determining two separate CSIs according to this disclosure. The embodiment shown in FIG. 15 is for illustration only. Other embodiments could be used without departing from the scope of this disclosure.

As shown in FIG. 15, UE1-UE4 1501-1504 are served by Cell#2 1520, and TDD UL-DL configuration 2 is the TDD UL-DL configuration for Cell#2 1520. UE1 1501 and UE2 1502 are close to Cell#1 1510 and, in DL flexible TTI#4 1554, experience similar interference as in DL fixed TTIs, such as TTI#0 1544. Consequently, a second bit in a bitmap included in a DCI format conveyed by TDD-ULDL-Adapt is set to '0'. Conversely, because UE1 and UE2 experience dominant UL interference from UL transmissions in TTI#3 of Cell#1 1542, for DL receptions in DL flexible TTI #3 1552, a first bit in the bitmap is set to '1'. The same TDD-ULDL-Adapt conveying a DCI format with CRC scrambled with a TDD-RNTI#1 can be used for UE1 and UE2. UE1 and UE2 can consider DL flexible TTI#3 and TTI#8 for determining a second CSI and DL flexible TTI#4 and TTI#9 together with fixed DL TTIs for computing a first CSI.

UE3 1503 and UE4 1504 are close to Cell#3 1530 and experience similar interference in DL flexible TTI #8 1556 as in DL fixed TTIs. Therefore, the fourth bit in a respective bitmap for UE3 and UE4 is set to '0'. Conversely, in DL flexible TTI #3 1552 and TTI#4 1554, UE3 and UE4 experience UL dominant interference from UL transmissions in TTI#3 1562 and TTI#4 1564 of Cell#3. Therefore, a first bit and a second bit in a respective bitmap are set to '1'. The same TDD-ULDL-Adapt conveying a DCI format with CRC scrambled with a TDD-RNTI#2 can be used for UE3 and UE4 to inform of a new TDD UL-DL configuration. UE3 and UE4 can consider DL flexible TTI#3 and TTI#4 for computing a second CSI and DL flexible TTI#8 and TTI#9 together with DL fixed TTIs for computing a first CSI.

For A-CSI computation, a first ZP CSI-RS resource can be configured in one or more of first DL TTIs as previously identified for the purpose of determining a first CSI, and a second ZP CSI-RS resource can be configured in one or more of second DL TTIs as previously identified for the purpose of determining a second CSI.

Similarly, for a bitmap indicating UL flexible TTIs for a UE to transmit a PUSCH or SRS using a first UL PC process or a second UL PC process, the bitmap can include all UL flexible TTIs within a frame as shown, for example, in TABLE 2. Therefore, a bitmap size can be equal to an actual number or to a maximum number of UL flexible TTIs within a frame. If a UE uses a first UL PC process in an UL flexible UL TTI (as for an UL fixed TTI), a respective value in the bitmap can be '0'. If a UE uses a second UL PC process in an UL flexible TTI (unlike for an UL fixed TTI), a respective value in the bitmap can be '1'. If a flexible TTI is a DL TTI and not a UL TTI, a respective value in the bitmap can be a predetermined value known to the UE, such as a value of '0'. For example, considering that TTI#3, TTI#4, TTI#6, TTI#7, TTI#8 and TTI#9 can be flexible TTIs (TABLE 2), the bitmap size can be 6 bits. Alternatively, the bitmap size can be 7 bits with TTI#2 always associated with the first UL PC process.

It is also possible to combine the bitmap for indicating DL flexible TTIs for a second CSI computation and UL flexible TTIs for a second UL PC process in a single bitmap. Because a UE knows which of the flexible TTIs are DL TTIs and which are UL TTIs, based on an indicator for an adapted TDD UL-DL configuration included in the DCI format conveyed by TDD-ULDL-Adapt, the UE can determine for each element in the bitmap whether it indicates a first CSI or a second CSI (in case the flexible TTI is a DL one) or whether it indicates a first UL PC process or a second UL PC process (in case the flexible TTI is an UL one).

As an example, if TTI#3, TTI#4, TTI#6, TTI#7, TTI#8 and TTI#9 are flexible TTIs and, in a current TDD UL-DL configuration, all flexible TTIs except TTI#7 are DL or special TTIs, a bitmap of {0, 1, 1, 1, 1, 0} can indicate to a UE to determine a second CSI in TTI#4 and TTI#8, determine a first CSI in TTI#3, TTI#6, and TTI#9, and transmit a PUSCH or SRS using a second UL PC process in TTI#6 and TTI#7. For example, if not all previous TTIs are flexible TTIs (such as when TDD UL-DL configuration 1 is a conventional TDD UL-DL configuration and TTI#4 and TTI#9 are DL fixed TTIs), a respective value in the bitmap can be predetermined, such as '0'. An example bitmap signaled to a UE can be {1, 0, 1, 1, 1, 0}, and the UE can determine a second CSI for TTI#3 and TTI#8, determine a first CSI for TTI#6 and TTI#9, and transmit PUSCH or SRS using a second UL PC process in TTI#6 and TTI#7. If the value of an element in the bitmap is not consistent with a conventional TDD UL-DL configuration, a UE can disregard the DCI format conveyed by a detected TDD-ULDL-Adapt.

A bitmap indicating DL flexible TTIs for a first CSI computation or a second CSI computation, a bitmap indicating UL flexible TTIs for a first UL PC process or a second UL PC process, or a bitmap indicating both DL flexible TTIs for a first or second CSI computation and UL flexible TTIs for a first or second UL PC process can be in DCI format or in another signaling, such as RRC signaling or MAC signaling.

Power Setting for CRS in Flexible DL TTIs

This embodiment considers that, in addition to DL fixed TTIs, CRS can also be transmitted in DL flexible TTIs. An eNB can inform a UE whether CRS transmission occurs in DL flexible TTIs through a respective "CRS presence" field that includes one or more bits. The "CRS presence" field can be provided to a UE by higher-layer signaling and it can be included in the 'ConfigureTDD-ULDL-Adapt' IE. If CRS exists by default in a system operation in a first OFDM symbol of a DL TTI, this indication can be interpreted as indicating whether a DL TTI is a normal DL TTI or a MBSFN TTI (CRS may exist only in the first one or two OFDM symbols and may not exist in the remaining OFDM symbols).

DL signals from an eNB are usually transmitted with substantially larger power than UL signals from a UE. For this reason, in order to avoid significant interference in a transmission of an UL signal in an UL flexible TTI from a transmission of a DL signal in a neighboring cell in a DL flexible TTI, a DL transmission power may need to be substantially reduced. For practical purposes, a DL signal may need to be transmitted with a power that is within a small range of a CRS transmission power, such as within four decibels (dBs). However, if a UE uses CRS from different DL TTIs (whether DL fixed TTIs or DL flexible TTIs) for measurements, such as for channel estimation, it can be beneficial for the UE to know whether there is a power offset between a CRS transmission in a DL fixed TTI and a DL flexible TTI and to also know the value of this power offset. Additionally, for data modulated with Quadrature Amplitude Modulation (QAM) and demodulated using a CRS-based channel estimate, a UE can assume that the ratio of Energy Per Resource Element (EPRE) between data and CRS is the same in respective symbols of DL fixed TTIs and DL flexible TTIs, or this ratio can be additionally signaled to a UE for a set of DL flexible TTIs.

In a first approach, an eNB includes, in a DCI format informing of an adapted TDD UL-DL configuration, a bitmap with a size equal to a maximum number of flexible TTIs, which can be either DL TTIs or UL TTIs. This bitmap is separate from the bitmap used to indicate flexible TTIs for computation of a first CSI or a second CSI or for use of a first UL PC process or a second UL PC process. A bit value of '0' can indicate that a CRS transmission power in a respective DL flexible TTI is the same as in a DL fixed TTI, while a bit value of '1' can indicate that a CRS transmission power in a respective DL flexible TTI is reduced relative to the one in a DL fixed TTI (or vice versa). The amount of CRS power reduction can be indicated by another field in the DCI format for TDD-ULDL-Adapt and will be referred to as a "CRS power offset" field or can be configured by higher layer signaling such as RRC signaling. For example, the "CRS power offset" field can include two bits. A value of '00' can indicate a CRS power reduction of 0 dB in a DL flexible TTI relative to a CRS transmission power in a DL fixed TTI. A value of '01' can indicate a CRS power reduction of 2 dB, a value of '10' can indicate a CRS power reduction of 4 dB, and a value of '11' can indicate a CRS power reduction of 6 dB.

In a second approach, a "CRS power offset" field of two bits can be included in a DCI format for TDD-ULDL-Adapt, and an associated value can be applicable to all DL flexible TTIs (or only to DL flexible TTIs than can be UL TTIs). The advantage of the second approach relative to the first approach is the absence of an additional bitmap indicating DL flexible TTIs with reduced CRS transmission power and therefore a smaller signaling overhead. A possible disadvantage of the second approach relative to the first approach is that CRS transmission power reduction may need to occur even in DL flexible TTIs that are used as DL TTIs from all interfering cells (that is, even when there is not any UL flexible TTI in a first cell that is a DL flexible TTI in a second cell).

In a third approach, a CRS can be transmitted with reduced power in a DL flexible TTI without an eNB indicating to a UE a respective CRS power offset relative to a CRS transmission power in a DL fixed TTI. However, in this case, an eNB can inform a UE by higher-layer signaling whether the same or different CRS transmission power can be assumed by the UE in a DL fixed TTI and in a DL flexible TTI, such as by using a one-bit "CRS power" field. This field can be provided to a UE by higher-layer signaling as part of the configuration for operation with adaptive TDD UL-DL configuration. A UE may consider only the CRS within a respective DL TTI for channel estimation and data demodulation, particularly in case QAM is used for data modulation in a respective PDSCH. A UE also can assume that a relative transmission power between CRS and data signals is the same in DL fixed TTIs and in DL flexible TTIs.

Signaling Considering CA Operation

In this embodiment, a UE is configured for CA operation in a set of cells and for operation with an adaptive TDD UL-DL configuration in a subset of the set of cells. For a DCI format that conveys information for adapted TDD UL-DL configurations for multiple cells, the UE is also configured, for each cell in the subset of cells, a respective location in the DCI format for a respective indicator of an adapted TDD UL-DL configuration (such as a three-bit indicator of an adapted TDD UL-DL configuration). Such a configuration can be, for example, by RRC signaling or MAC signaling.

Operation with an adaptive TDD UL-DL configuration can be supported in all cells or in a subset of cells configured for CA to a UE. For example, some of the cells may not support such operation or may even use FDD, while operation with an adaptive TDD UL-DL configuration can be supported in a subset of cells that use TDD. In the following, the phrase "TDD-Cell" refers only to a cell where a UE is configured for operation with an adaptive TDD UL-DL configuration (in addition to being configured for CA operation).

If a DCI format for TDD-ULDL-Adapt conveys X indicators of respective TDD UL-DL reconfigurations for X TDD-Cells, a UE configured for operation with an adaptive TDD UL-DL configuration in Num_Cells TDD-Cells can also be configured, using Ceiling($\log_2$ X) bits for each of the Num_Cells TDD-Cells, respective locations in the DCI format for indicators of TDD UL-DL reconfigurations. The function Ceiling(y) results in the smallest integer that is larger than or equal to y. A TDD-Cell can be identified, for example, by its physical cell ID (PCID), its locations, or its global identifier. For example, for two TDD-Cells, if they have the same carrier but different PCIDs, they can be treated as different TDD-Cells. In some of the examples in this disclosure, different TDD-Cells can have different carriers but this disclosure is not limited to such.

TABLE 7 indicates an example configuration for a UE to determine locations in a DCI format for TDD-ULDL-Adapt respective indicators of adapted TDD UL-DL configurations corresponding to each of its Num_Cells TDD-Cells. In TABLE 7, for each TDD-Cell, Ceiling($\log_2$ X) bits are used to indicate a respective location for an indicator of an adapted TDD UL-DL configuration in the DCI format. As an alternative, a bitmap of X bits can be used for each of the TDD-Cells, with a value of '1' indicating the location in the DCI format for a respective indicator and the remaining bitmap values all being '0' (or vice versa).

TABLE 7

Example configuration for a UE to determine locations in a DCI format for indicators of adapted TDD UL-DL configurations corresponding to its Num_Cells TDD-Cells

| | Size (bits) | Information |
|---|---|---|
| Location index for an adapted TDD UL-DL configuration for a first TDD-Cell | Ceiling ($\log_2$ X) | Indicate the location in the DCI format for an adapted TDD UL-DL configuration for its first TDD-Cell |
| . . . | . . . | . . . |
| Location index for an adapted TDD UL-DL configuration for the (Num_Cells)$^{th}$ TDD-Cell | Ceiling ($\log_2$ X) | Indicate the location in the DCI format for an adapted TDD UL-DL configuration for its (Num_Cells)$^{th}$ TDD-Cell |

As an example, for four different TDD-Cells with carriers x1, x2, x3, x4 that support adaptive TDD UL-DL configurations in respective TDD-Cells, a UE1 can be configured for CA operation in the first and third TDD-Cells and a UE2 can be configured for CA operation in the second and fourth TDD-Cells. For a DCI format providing indicators of adapted TDD UL-DL configurations for X=4 cells, even though the UE-specific indexes of TDD-Cells are {1, 2} for both UE1 and UE2, UE1 can be configured to monitor the first and third indicators in the DCI format through location values '00' and '10', while UE2 can be configured to monitor the second and fourth indicators in the DCI format through location values '01' and '11'. Further, if UE3 has three TDD-Cells with indexes {1, 2, 3} configured for CA operation on carriers x2, x3, x4, respectively, location values '01', '10' and '11' can be respectively used to indicate the indicators in the DCI format. Alternatively, UE1 can be configured to monitor the first and third indicators in the DCI format through respective location bitmaps having values '1000' and '0010', UE2 can be configured to monitor the second and fourth indicators in the DCI format through respective location bitmaps having values '0100' and '0001', and UE3 can be configured to monitor the second, third and fourth indicators in the DCI format through respective location bitmaps having values '0100', '0010', and '0001'.

FIG. 16 illustrates an example DCI format according to this disclosure. Locations in the DCI format 1600 provide an indicator for an adapted TDD UL-DL configuration where each location corresponds to a TDD-Cell. The embodiment of the DCI format 1600 shown in FIG. 16 is for illustration only. Other embodiments could be used without departing from the scope of this disclosure.

Referring to FIG. 16, DCI format 1600 provides X indicators of adapted TDD UL-DL configurations for respective X TDD-Cells. UE-j 1660 is configured to monitor a first location 1630 and an $i^{th}$ location 1640 for first and $i^{th}$ indicators for adapted TDD UL-DL configurations, respectively. UE-k 1670 is configured to monitor a first location 1630 and an $X^{th}$ location 1650 for first and $X^{th}$ indicators for adapted TDD UL-DL configurations, respectively.

Instead of a UE receiving a location for a respective indicator in a DCI format for adapted TDD UL-DL configurations, the UE can receive an ordered list of its Num_Cells of TDD-Cells or an ordered list of its Num_Cells of TDD-Cells. The UE can also receive an X-bit bitmap that contains Num_Cells bits, with a bit value of '1' indicating the respective positions for indicators of adapted TDD UL-DL configurations for Num_Cells TDD-Cells within the X indicators in the DCI format and a bit value of '0' otherwise for all remaining bits (or vice versa). For example, the ordered list can have a total number of bits Num_Cells*Ceiling($\log_2$ Num_Cells) if each TDD_Cell for a UE is indexed by Ceiling($\log_2$ Num_Cells) bits. If the ordered list of a UE's Num_Cells of TDD-Cells has respective TDD-Cells aligned in order to the list of X indicators in the DCI format, the ordered list of its Num_Cells of TDD-Cells can be omitted in the signaling. The bitmap can serve as a mask to mark the positions of Num_Cells TDD-Cells in the X indicators for adapted TDD UL-DL configurations.

TABLE 7A shows an example configuration for a UE to determine locations for indicators of adapted TDD UL-DL configurations of its Num_Cells of TDD-Cells in a respective DCI format.

TABLE 7A

Example configuration for a UE to determine
locations for indicators of adapted TDD UL-DL
configurations of its Num_Cells TDD-Cells

| | Size (bits) | Information |
|---|---|---|
| Bitmap Indication of respective positions of Num_Cells indicators within X indicators in DCI format for adapted TDD UL-DL configurations | X | If the $i^{th}$ indicator within the X indicators in the DCI format is for one of the Num_Cells TDD_Cells, the $i^{th}$ bit of the bitmap has example value '1', otherwise, the value is '0'. |
| An ordered list of Num_Cells of TDD_Cells | Num_Cells * Ceiling ($\log_2$ Num_Cells) | An ordered list of Num_Cells TDD_Cells where the ordering is according to the order in the X locations in the DCI format for adapted TDD UL-DL configurations |

As an example, if there are four TDD-Cells with carriers x1, x2, x3, x4 whose indicators of adapted TDD UL-DL configurations are in respective X locations in a DCI format and UE2 has TDD-Cells having indexes {1, 2} on respective carriers x4 and x2, UE2 can receive an ordered list of carriers {x2, x4} and a bitmap of '0101'. UE2 can then determine that the indicator for an adapted TDD UL-DL configuration for the TDD-Cell in the first carrier in the list, which is x2, is at the second location in the DCI format. UE2 can also determine that the indicator for an adapted TDD UL-DL configuration for the TDD-Cell in the second carrier in the list, which is x4, is at the fourth location in the DCI format. As an optimization, if UE2 has TDD-Cells with indexes {1, 2} on respective carriers x2 and x4, the ordered list of its TDD-Cells carriers or an ordered list of its TDD-Cells can be omitted in the signaling, and only the bitmap can be signaled.

In an alternative, a UE can receive an ordered list of X TDD-Cells (such as according to respective carrier frequencies) that correspond to the X locations in the DCI format for indicating adapted TDD UL-DL configurations to a group of UEs. If there are Y TDD-Cells configured to the group of UEs corresponding to respective Y TDD-Cells, the signaling of an ordered list of X TDD-Cells can use X*Ceiling($\log_2$ Y) bits. For example, if carriers x1, x2, x3, x4 are the X=4 carriers signaled in the ordered list, which correspond to the first, second, third, and fourth locations, respectively, in the DCI format, UE2, with TDD-Cells having indexes {1, 2} on respective carriers x4 and x2, determines that the fourth location of the X locations in the DCI format is for TDD UL-DL reconfiguration of its first TDD-Cell and the second location of the X locations in the DCI format is for TDD UL-DL reconfiguration for its second TDD-Cell.

If a DCI format for adapted TDD UL-DL configurations that is transmitted in a PCell does not have sufficient capacity to accommodate all indicators for TDD UL-DL reconfigurations for all TDD-Cells associated with the PCell, a UE can be configured to receive a DCI format with larger size for TDD UL-DL reconfigurations. For example, instead of a DCI format with size equal to DCI Format 1C, the UE can be configured to monitor (decode) for adapted TDD UL-DL configurations a DCI format with size equal to DCI Format 3/3A. The UE can also be configured to receive one or multiple additional DCI formats for adapted TDD UL-DL configurations for different TDD-Cells.

DCI formats for a group of UEs providing indicators of adapted TDD UL-DL configurations for TDD-Cells can be partitioned to S DCI formats (or as an extension to S subsets of DCI formats). Each DCI format s (for s=1, 2, . . . , S) can have a DCI_Format_Indicator. The partition can be based on, for example, different time-domain resources used to transmit each DCI format, different TDD-RNTI used to scramble the CRC for each DCI format, different subset of carriers whose indicators of TDD UL-DL reconfiguration are included in each DCI format, different size for each DCI format, or a combination of two or more of these. The signaling to a UE can include, for each DCI format s, a DCI_Format_Indicator and an indication for a respective location for the indicator of an adapted TDD UL-DL configuration in the DCI format. The signaling can be an extension of the aforementioned signaling from one DCI format to S DCI formats.

TABLE 7B (as an extension of TABLE 7) illustrates an example configuration for a UE to determine a DCI format and a location in the DCI format for indicators of TDD UL-DL reconfigurations for its Num_Cells TDD-Cells. Signaling informing of locations for indicators in a DCI format s can be together with signaling informing of the DCI_Format_Indicator. For a UE, different DCI formats can have the same or a different number of locations for indicators of TDD UL-DL reconfigurations.

TABLE 7B

Example configuration for a UE to determine a DCI
format and a location in the DCI format for indicators
of adapted TDD UL-DL configurations
for its Num_Cells TDD-Cells

| Field | Content | Information |
|---|---|---|
| Location for indicator of an adapted | DCI_Format_Indicator for a DCI format, and a location | Indicate DCI_Format_Indicator and location in the DCI format for an indicator |

TABLE 7B-continued

Example configuration for a UE to determine a DCI
format and a location in the DCI format for indicators
of adapted TDD UL-DL configurations
for its Num_Cells TDD-Cells

| Field | Content | Information |
|---|---|---|
| TDD UL-DL configuration for a first TDD-Cell | index in the DCI format | of an adapted TDD UL-DL configuration for a first TDD-Cell |
| . . . | . . . | . . . |
| Location for indicator of an adapted TDD UL-DL configuration for a (Num_Cells)$^{th}$ TDD-Cell | DCI_Format_Indicator for a DCI format, and a location index in the DCI format | Indicate DCI_Format_Indicator and location in the DCI format for an indicator of an adapted TDD UL-DL configuration for a (Num_Cells)$^{th}$ TDD-Cell |

Alternatively, an example description for a respective signaling can be as in TABLE 7C (as an extension of TABLE 7A). A UE can receive an ordered list of its Num_Cells_Subset_s of TDD-Cells for the s$^{th}$ DCI format, where s=1, . . . , S (or an ordered list of its respective TDD-Cells corresponding to Num_Cells_Subset_s of TDD-Cells for the s$^{th}$ DCI format). A UE can also receive an X_s-bit bitmap that contains Num_Cells_Subset_s bits, where bits having a value of '1' indicate respective positions for indicators of respective TDD UL-DL reconfigurations for Num_Cells_Subset_s TDD-Cells within the X indicators in s$^{th}$ DCI format, and where all remaining bits in the bitmap can have a value of '0' (or vice versa). An s$^{th}$ DCI format, s=1, . . . , S, is indicated to the UE by higher-layer signaling through an s$^{th}$ DCI_Format_Indicator. If the ordered list for Num_Cells_Subset_s of TDD-Cells in the s$^{th}$ subset for a UE has respective TDD-Cells aligned in order to the list of X_s indicators in the DCI format with s$^{th}$ DCI_Format_Indicator, the ordered list of its Num_Cells of TDD-Cells can be omitted in the signaling.

TABLE 7C

Example configuration for a UE to determine
locations in a DCI format, with a s$^{th}$
DCI_Format_Indicator, for indicators
of adapted TDD UL-DL configurations for its
Num_Cells_Subset_s TDD-Cells

| | Size (bits) | Information |
|---|---|---|
| Bitmap Indication of respective positions of Num_Cells_Subset_s indicators within X_s indicators in DCI format for adapted TDD UL-DL configurations | X_s | If the i$^{th}$ indicator within the X_s indicators in the DCI format is for one of the Num_Cells_Subset_s TDD_Cells, the i$^{th}$ bit of the bitmap has value '1', otherwise, the value is '0'. |
| An ordered list of Num_Cells_Subset_s of TDD_Cells | Num_Cells_Subset_s * Ceiling (log$_2$ Num_Cells_Subset_s) | An ordered list of Num_Cells_Subset s TDD_Cells where the ordering is according to the order in the X_s locations in the DCI format for adapted |

TABLE 7C-continued

Example configuration for a UE to determine
locations in a DCI format, with a s$^{th}$
DCI_Format_Indicator, for indicators
of adapted TDD UL-DL configurations for its
Num_Cells_Subset_s TDD-Cells

| Size (bits) | Information |
|---|---|
| | TDD UL-DL configurations |

Alternatively, a respective signaling to a UE can be an ordered list of TDD-Cells whose indicators of TDD adapted UL-DL configurations for each subset s of DCI format are with s$^{th}$ DCI_Format_Subset_Indicator.

A number of approaches will now be described for partitioning DCI formats, for adaptations of TDD UL-DL reconfigurations for TDD-Cells, to S DCI formats. Combinations of these approaches can also be supported.

In a first approach, a partitioning of DCI formats for TDD UL-DL reconfigurations to S DCI formats is based on different time-domain resources (different TTIs) for transmitting a DCI format. A transmission of each s$^{th}$ DCI format, s=1, . . . , S, is associated with a set of time-domain resources (such as TTIs) that are orthogonal with the resources associated with a transmission of any other s' DCI format, s'=1, . . . , s−1, s+1 . . . , S (where s is different than s'). A configuration of time-domain resources for each DCI format can be included, for example, in 'ConfigureTDD-ULDL-Adapt' as in the first embodiment of this disclosure. For example, for a first DCI format, a first set of TTIs can be configured to a UE for transmitting the first DCI format. For a second DCI format, a second set of TTIs can be configured to the UE for transmitting the second DCI format.

As an example, indicators for adapted TDD UL-DL configurations for TDD-Cells with carriers x1, x2, x3, x4 can correspond to X_1=4 locations (first, second, third, and fourth locations, respectively) in a first DCI format configured to be transmitted in a first set of TTIs. Indicators for adapted TDD UL-DL configurations for TDD-Cells with carriers x5, x6 can correspond to X_2=2 locations (first and second locations, respectively) in a second DCI format configured to be transmitted in a second set of TTIs. UE4, having indexes {1, 2} for TDD-Cells on respective carriers x2 and x5, can be configured a second location of the X_1 locations in the first DCI format configured to be transmitted in the first set of TTIs for the indicator of the adapted TDD UL-DL configuration for its first TDD-Cell. UE4 can also be configured a first location of the X_2 locations in the second DCI format configured to be transmitted in the second set of TTIs for the indicator of the adapted TDD UL-DL configuration for its second TDD-Cell.

Figure 17:
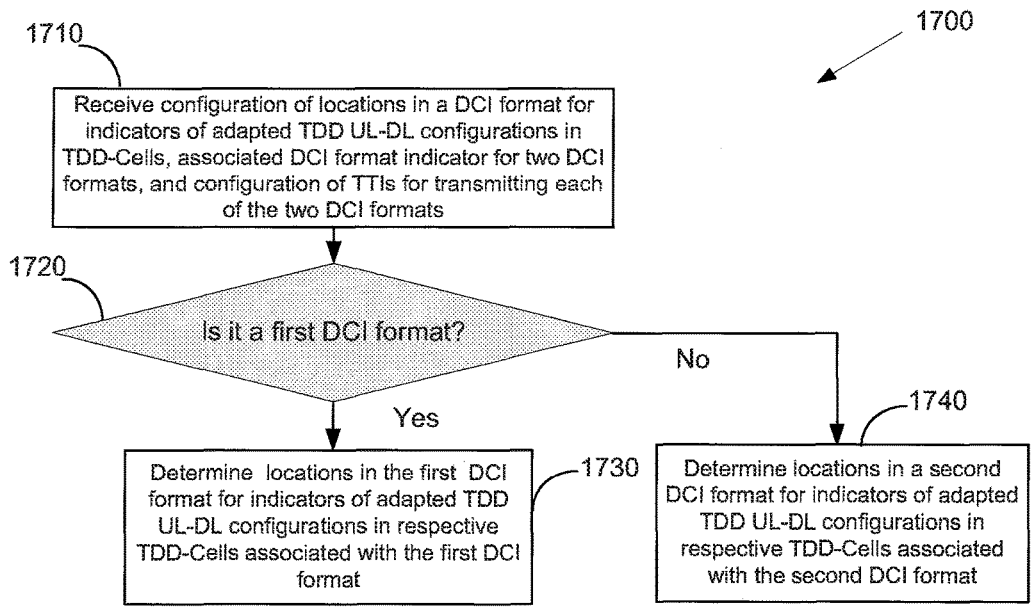
FIG. 17 illustrates an example method for a UE to determine locations for indicators of adapted TDD UL-DL configurations for its TDD-Cells according to this disclosure.

FIG. 17 illustrates an example method 1700 for a UE to determine locations for indicators of adapted TDD UL-DL configurations for its TDD-Cells according to this disclosure. In method 1700, the locations are provided by two DCI formats. The embodiment of the method 1700 shown in FIG. 17 is for illustration only. Other embodiments of method 1700 could be used without departing from the scope of this disclosure.

Referring to FIG. 17, in operation 1710, a UE receives a configuration of locations in a DCI format for indicators of adapted TDD UL-DL configurations in TDD-Cells, an associated DCI format indicator for two DCI formats, and configuration of TTIs for transmitting each of the two DCI formats. In operation 1720, the UE determines, in a TTI supporting transmissions of DCI formats for adapted TDD UL-DL configurations, whether a DCI format is a first DCI format. If it is, in operation 1730, the UE determines locations in the first DCI format for indicators of adapted TDD UL-DL configurations in respective TDD-Cells associated with the first DCI format. Otherwise, in operation 1740, the UE determines locations in a second DCI format for indicators of adapted TDD UL-DL configurations in respective TDD-Cells associated with the second DCI format.

In a second approach, a different TDD-RNTI can be used to scramble each respective CRC for each of multiple DCI formats conveying indicators for adapted TDD UL-DL configurations for TDD-Cells associated with the PCell. In the information element 'ConfigureTDD-ULDL-Adapt', a set of TTIs can also be configured for each configured TDD-RNTI where a respective DCI format is transmitted. For example, a first TDD-RNTI can be used for a first DCI format, and a second TDD-RNTI can be used for a second DCI format, and the first DCI format can be configured to be transmitted in the first TTI of a last frame of a validity period of an adapted TDD UL-DL configuration, while the second DCI format can be configured to be transmitted in the second TTI of the last frame of the validity period. A UE can be configured locations for indicators of adapted TDD UL-DL configurations for its TDD-Cells. A configuration of locations can also include an indicator of a TDD-RNTI used to scramble a CRC of a respective DCI format, or a DCI_Format_Indicator (such as in TABLE 7B, TABLE 7C, or FIG. 17) can be the indicator of a TDD-RNTI.

As an example, indicators for adapted TDD UL-DL configurations for TDD-Cells with carriers x1, x2, x3, x4 can correspond to $X\_1=4$ locations (first, second, third, and fourth locations, respectively) in a first DCI format with TDD-RNTI1. Indicators for adapted TDD UL-DL configurations for TDD-Cells with carriers x5, x6 can correspond to $X\_2=2$ locations (first and second locations, respectively) in a second DCI format with TDD-RNTI2. UE4, having indexes {1, 2} for TDD-Cells on respective carriers x2 and x5, can be configured a second location of the X_1 locations in the first DCI format with TDD-RNTI1 for the indicator of the adapted TDD UL-DL configuration for its first TDD-Cell. UE4 can also be configured a first location of the X_2 locations in the second DCI format with TDD-RNTI2 for the indicator of the adapted TDD UL-DL configuration for its second TDD-Cell.

In a third approach, a partitioning of DCI formats for TDD UL-DL reconfigurations to S DCI formats is based on different respective TDD-Cells. An indicator of the subset of TDD-Cells can be included in a DCI format indicating adapted TDD UL-DL configurations, such as in a field in the DCI format. A set of all TDD-Cells of a group of UEs can be partitioned into subsets of TDD-Cells, where indicators for adapted TDD UL-DL configurations of TDD-cells corresponding to each subset of TDD-Cells can be also indicated in a respective DCI format. The DCI_Format_Indicator (such as in TABLE 7B, TABLE 7C, or FIG. 17) can be the indicator of a subset of TDD-Cells.

As an example, TDD-Cells with carriers x1, x2, x3, x4 are in a first subset and correspond to $X\_1=4$ locations (first, second, third, and fourth locations, respectively) in a first DCI format that includes a subset indicator '0'. Carriers x5, x6, x7, x8 are in a second subset and correspond to $X\_2=4$ locations (first, second, third, and fourth locations, respectively) in a second DCI format that includes a subset indicator '1'. If UE5 has TDD-Cells with indexes {1, 2, 3} on respective carriers x2, x5, x7, UE5 can receive a bitmap with value '0100' for the first DCI format and a bitmap with value '1010' for the second DCI format. UE5 determines that the second location of the $X\_1=4$ locations in the first DCI format is for an indicator of an adapted TDD UL-DL configuration for its first TDD-Cell. UE5 also determines that the first and third locations of the $X\_2=4$ locations in the second DCI format are for indicators of adapted TDD UL-DL configurations for its second and third TDD-Cells, respectively.

FIG. 18 illustrates another example DCI format 1800 according to this disclosure. The DCI format 1800 includes a TDD-Cells subset indicator and locations of indicators for adapted TDD UL-DL configurations where each location corresponds to a TDD-Cell. The embodiment of the DCI format 1800 shown in FIG. 18 is for illustration only. Other embodiments could be used without departing from the scope of this disclosure. Referring to FIG. 18, a TDD-Cell subset indicator 1820 can be added to the DCI format 1800 conveying indicators for adapted TDD UL-DL configurations. The locations 1830-1850 are similar to locations 1630-1650 in FIG. 16.

Figure 19:
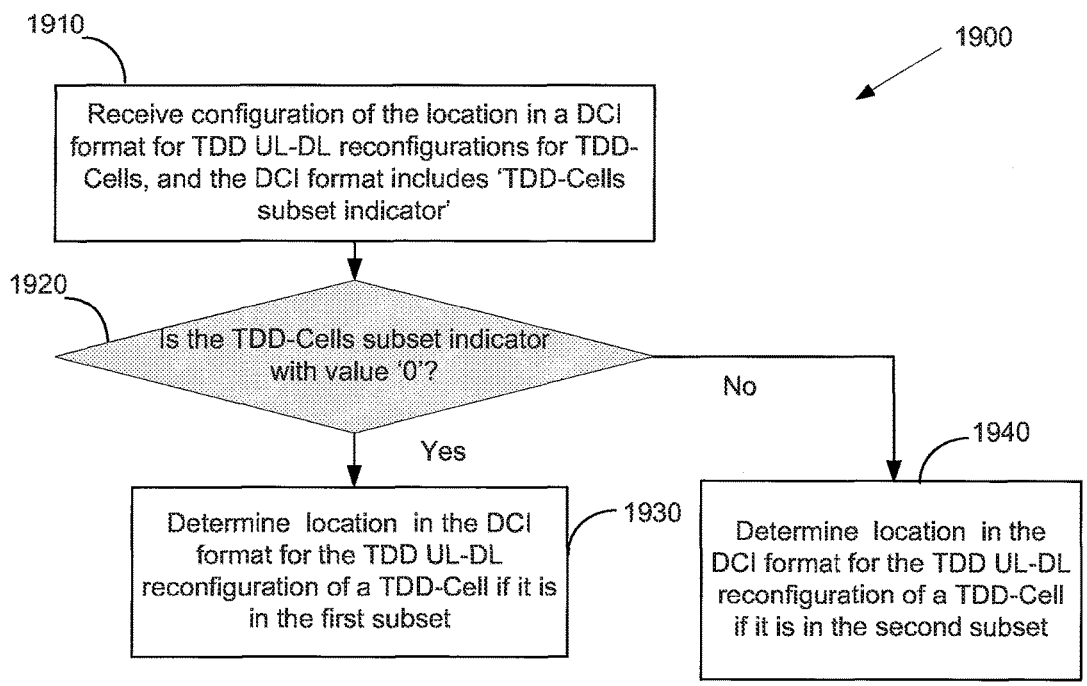
FIG. 19 illustrates another example method for a UE to determine locations for indicators of TDD UL-DL reconfigurations of its TDD-Cells for two subsets of TDD-Cells according to this disclosure.

FIG. 19 illustrates another example method 1900 for a UE to determine locations for indicators of adapted TDD UL-DL configurations of its TDD-Cells for two subsets of TDD-Cells according to this disclosure. The embodiment of the method 1900 shown in FIG. 19 is for illustration only. Other embodiments of method 1900 could be used without departing from the scope of this disclosure.

Referring to FIG. 19, in operation 1910, a UE receives a configuration of locations in a DCI format for indicators of adapted TDD UL-DL configurations, and the DCI format also includes a 'TDD-Cells subset indicator' field. In operation 1920, the UE determines whether the TDD-Cells subset indicator field in the DCI format has a value of '0'. If it does, in operation 1930, the UE determines locations in the DCI format for indicators of adapted TDD UL-DL configurations if the TDD-Cell is in the first subset. Otherwise, in operation 1940, the UE determines locations in the DCI format for indicators of adapted TDD UL-DL configurations if the TDD-Cell is in the second subset.

In a fourth approach, a partitioning of DCI formats for adapted TDD UL-DL configurations to S DCI formats is based on different respective sizes of the DCI format. Different DCI formats can have different sizes. The DCI_Format_Indicator can be the indicator of a size of a DCI format. For example, two DCI formats maybe used, where one DCI format can have a size equal to DCI Format 1C and the other format can have a size equal to DCI Format 3/3A. The size of the DCI format can be configured, for example, by including it in 'ConfigureTDD-ULDL-Adapt'.

As an example, indicators for adapted TDD UL-DL configurations for TDD-Cells with carriers x1, x2, x3, x4 can correspond to $X\_1=4$ locations (first, second, third, and fourth locations, respectively) in a first DCI format with a size equal to DCI Format 3/3A. Indicators for adapted TDD UL-DL configurations for carriers x5, x6 can correspond to $X\_2=2$ locations (first and second locations, respectively) in a second DCI format with a size equal to DCI Format 1C. UE4, having indexes {1, 2} for TDD-Cells on respective carriers x2 and x5, can be configured a second location of the X_1 locations in the first DCI format for the indicator of the adapted TDD UL-DL configuration for its first TDD-Cell. UE4 can also be configured a first location of the X_2 locations in the second DCI format for the indicator of the adapted TDD UL-DL configuration for its second TDD-Cell.

Instead of the DCI formats conveying indicators of adapted TDD UL-DL configuration for TDD-Cells being transmitted in a CSS of a PCell, a UE can be configured to receive one or more such DCI formats in respective CSS's of one or more of its SCells (such as in a TDD-Cell that is an SCell). This can alleviate CSS capacity shortages in the PCell for transmitting all DCI formats conveying indicators of adapted TDD UL-DL configurations for all TDD-Cells associated with the PCell. Therefore, if the CSS of the PCell does not have sufficient space to accommodate all indicators for adapted TDD UL-DL configurations in TDD-Cells having the same PCell (such as because multiple DCI formats indicating adapted TDD UL-DL configurations need to be transmitted in the CSS of the PCell), a UE can be configured to receive the DCI format indicating an adapted TDD UL-DL configuration for some of its TDD-Cells in a CSS of an SCell such as a TDD-Cell (where the signaling and operations can be similar to the ones aforementioned for CSS of a PCell) or by a UE-DSS of a PCell, a UE-DSS or an SCell, RRC signaling, MAC signaling, and so on.

As an example, for a PCell associated with Num_Cells having operation with respective adapted TDD UL-DL configurations and for a capacity of a DCI format for indicating adapted TDD UL-DL configurations for Num_Cells_IndicatedInPCellDCI TDD-Cells (such as using a three-bit TDD UL-DL reconfiguration field for each TDD-Cell), with Num_Cells_IndicatedInPCellDCI<Num_Cells, a single DCI format cannot support indications for adapted TDD UL-DL configurations for all Num_Cells. As a result, multiple such DCI formats can be used. All of the multiple DCI formats can be transmitted in the PCell, as it was previously described, or some of the multiple DCI formats can be transmitted in one or more CSS of respective one or more SCells that can be TDD-Cells. This can be done in order to reduce congestion in the CSS of the PCell in TTIs where the DCI formats can be transmitted, such as in DL fixed TTIs of a last frame for a validity period of an adapted TDD UL-DL configuration.

TABLE 8 indicates an example configuration for a UE to determine locations for indicators of adapted TDD UL-DL configurations for its TDD-Cells in a DCI format transmitted in the PCell and in a DCI format transmitted in one of its SCells. A same number of X indicators in the DCI format is assumed to be transmitted in the PCell and the SCell. However, in general, the number of indicators in the DCI format transmitted in the PCell or an SCell can be different.

TABLE 8

Example configuration for a UE to determine locations for indicators of adapted TDD UL-DL configurations in two DCI formats wherein one DCI format is transmitted in the PCell

| | Size (bits) | Information |
| --- | --- | --- |
| Location index for indicators of adapted TDD UL-DL configurations for a first set of $N_1$ TDD-Cells in a DCI format transmitted in the PCell | $N_1 \cdot \text{Ceiling}(\log_2 X)$ | Indicates locations in the DCI format for adapted TDD UL-DL configurations for a first set of TDD-Cells that include the PCell |
| Location index for indicators of adapted TDD UL-DL configurations | $N_2 \cdot \text{Ceiling}(\log_2 X)$ | Indicates locations in the DCI format for TDD UL-DL adapted |
| for a second set of $N_2$ TDD-Cells in a DCI format transmitted in an SCell | | configurations for second set of Cells |

As another example, assume UE4 has three TDD-Cells with CA indexes {1, 2, 3} on carriers {x4, x2, x5}, respectively, where carrier x5 does not belong to the list of X=4 carriers {x1, x2, x3, x4} corresponding to TDD-Cells with indicators for adapted TDD UL-DL configurations provided by a DCI format transmitted in the PCell. A configuration to UE4 can include indexes '11' and '01' that indicate locations (fourth and second locations), among X=4 possible locations, in the DCI format transmitted in the PCell for indicators of adapted TDD UL-DL configurations. A configuration to UE4 can also include an indication of a TDD-Cell with index 3 (such as '10') on carrier x5 to be the TDD-Cell (SCell) where a respective indicator for an adapted TDD UL-DL configuration is provided by a DCI format transmitted in the TDD-Cell. UE4 can then determine to receive an indicator of adapted TDD UL-DL configuration for its third TDD-Cell from the DCI format transmitted in the TDD-Cell.

Figure 20:
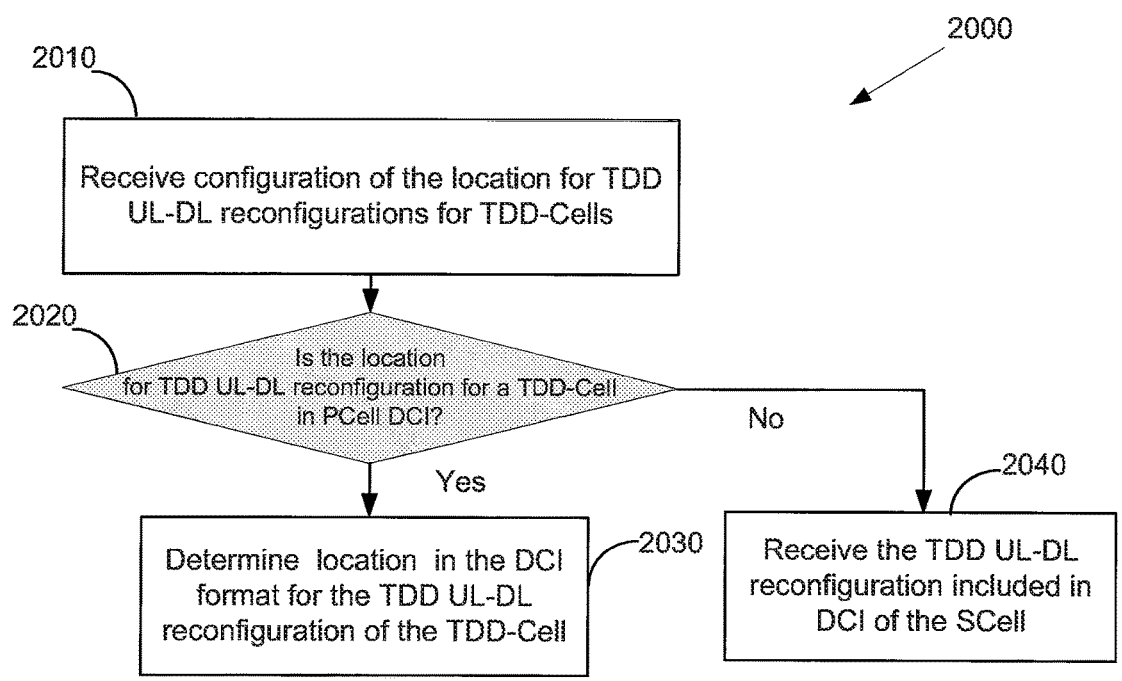
FIG. 20 illustrates an example method for a UE to determine locations for indicators of adapted TDD UL-DL configurations for its TDD-Cells according to this disclosure.

FIG. 20 illustrates an example method 2000 for a UE to determine locations for indicators of adapted TDD UL-DL configurations for its TDD-Cells according to this disclosure. The embodiment of the method 2000 shown in FIG. 20 is for illustration only. Other embodiments of method 2000 could be used without departing from the scope of this disclosure.

Referring to FIG. 20, in operation 2010, a UE receives a configuration of locations of indicators for adapted TDD UL-DL configurations for TDD-Cells. In operation 2020, the UE determines, for each TDD-Cell, whether or not a location for the indicator of a respective adapted TDD UL-DL configuration is in the DCI format transmitted in the PCell. If it is in the DCI format transmitted in the PCell, in operation 2030, the UE determines an adapted TDD UL-DL configuration according to an indicator at a respective location in the DCI format. Otherwise, in operation 2040, the UE determines an adapted TDD UL-DL configuration according to an indicator at a respective location in a DCI format transmitted in a configured SCell.

When the UE is configured for CA operation, a different interpretation of a DL HARQ reference TDD UL-DL configuration or the UL HARQ reference TDD UL-DL configuration is needed for operation with an adapted TDD UL-DL configuration in a SCell than for single-cell operation. With CA operation, HARQ-ACK information from a UE can be transmitted in the PCell. Moreover, a PDSCH transmission to the UE or a PUSCH transmission from the UE in the SCell can be scheduled either by a PDCCH conveying a respective DCI format that is transmitted in the SCell (referred to as self-scheduling) or by a PDCCH conveying a respective DCI format that is transmitted in a different cell (referred to as cross-scheduling) that can be the PCell or another SCell. In case of cross-scheduling, the cell where the PDCCH is transmitted is referred to as the scheduling cell and the SCell where a respective PDSCH or PUSCH transmission occurs is referred to as the scheduled cell. For operation with CA and an adapted TDD UL-UL configuration in a SCell, separate definitions for the DL HARQ reference TDD UL-DL configuration and for the UL HARQ reference TDD UL-DL configuration are needed compared to single-cell operation with an adapted TDD UL-DL configuration. The following cases are considered assuming that transmission of HARQ-ACK information from a UE in response to PDSCH scheduling in the SCell is on the PCell.

Case 1: Self-scheduling and TDD PCell. A DL HARQ reference TDD UL-DL configuration is determined from a configured DL HARQ reference TDD UL-DL configuration and from the TDD UL-DL configuration used in the PCell. A set of UL TTIs for transmission of HARQ-ACK information from a UE is determined to include all UL TTIs that are common between the configured DL HARQ reference TDD UL-DL configuration and the TDD UL-DL configuration used in the PCell. Consequently, HARQ-ACK information payload and timing are determined according to the above common set of UL TTIs. An UL HARQ reference TDD UL-DL configuration is considered to be a conventional TDD UL-DL configuration, and the UE is configured by RRC signaling for the SCell.

Case 2: Self-scheduling and FDD PCell. A DL HARQ reference TDD UL-DL configuration is configured to a UE but it has different functionality that for single-cell operation. The DL HARQ reference TDD UL-DL configuration is now applicable only for determining a payload of transmitted HARQ-ACK information and is not applicable for determining its timing that instead follows the timing on the FDD PCell. The HARQ-ACK information in each TTI of the PCell is determined by including HARQ-ACK information for the SCell for a TTI that supports DL data transmission according to the DL HARQ reference configuration and to not include HARQ-ACK information for the SCell for a TTI that does not support DL data transmission according to the DL HARQ TDD UL-DL reference configuration, regardless of whether the UE received DL data transmission in the SCell in the TTI and regardless of whether the TTI is an UL TTI in an adapted TDD UL-DL configuration that the UE uses for DL receptions in the SCell. An UL HARQ reference TDD UL-DL configuration is considered to be a conventional TDD UL-DL configuration, and the UE is configured by RRC signaling for the SCell.

Case 3: Cross-scheduling and TDD PCell. A DL HARQ reference TDD UL-DL configuration is considered to be as in Case 1. An UL HARQ reference TDD UL-DL configuration is determined from a conventional TDD UL-DL configuration transmitted to a UE by RRC signaling for the SCell and from the TDD UL-DL configuration used in the PCell. DL TTIs for transmission of HARQ-ACK information to a UE, or for transmission of DCI formats scheduling PUSCH transmissions from the UE, are determined as the DL TTIs that are common to the configured conventional TDD UL-DL configuration for the SCell and to the TDD UL-DL configuration used in the PCell.

Case 4: Cross-scheduling and FDD PCell. A DL HARQ reference TDD UL-DL configuration is considered to function as in Case 2. An UL HARQ reference TDD UL-DL configuration is a conventional TDD UL-DL configuration a UE is configured by RRC signaling for the SCell.

Although the present disclosure has been described with example embodiments, various changes and modifications may be suggested to one skilled in the art. It is intended that the present disclosure encompass such changes and modifications that fall within the scope of the appended claims.

What is claimed is:

1. A method, comprising:
receiving configuration information for
a reception periodicity for a physical downlink control channel (PDCCH) conveying a downlink control information (DCI) format, wherein the PDCCH reception is over a number of control channel elements (CCEs),
a number of CCEs for the PDCCH reception,
a size for the DCI format, and
a set of locations in the DCI format for a respective set of fields corresponding to a set of cells;
detecting the DCI format; and
dropping a transmission in a time resource of a cell from the set of cells when a respective field in the DCI format indicates the time resource to be a downlink time resource.

2. The method of claim 1, further comprising:
receiving configuration information for a number of PDCCH candidates wherein the CCEs for a PDCCH candidate are determined according to a common search space and the PDCCH reception is in one of the PDCCH candidates.

3. The method of claim 1, further comprising:
receiving configuration information indicating a set of downlink time resources, a set of uplink time resources, and a set of flexible time resources for a cell, wherein an indication by a corresponding field in the DCI format is applicable only to the set of flexible time resources.

4. The method of claim 3, wherein, for a time resource from the set of flexible time resources, the indication by the field in the DCI format is that the time resource is a downlink time resource or an uplink time resource.

5. The method of claim 1, wherein the indication by the field in the DCI format is applicable after a predetermined time.

6. The method of claim 1, wherein the PDCCH reception is in a secondary cell.

7. The method of claim 1, wherein the DCI format has same size as a DCI format scheduling reception of system information and wherein functionality of the DCI format is determined by a radio network temporary identifier (RNTI) scrambling cyclic redundancy check (CRC) bits of the DCI format.

8. A user equipment, comprising:
a receiver configured to receive configuration information for
a reception periodicity for a physical downlink control channel (PDCCH) conveying a downlink control information (DCI) format, wherein the PDCCH reception is over a number of control channel elements (CCEs),
a number of CCEs for the PDCCH reception,
a size for the DCI format, and
a set of locations in the DCI format for a respective set of fields corresponding to a set of cells;
a decoder configured to detect the DCI format; and
a transmitter configured to drop a transmission in a time resource of a cell from the set of cells when a respective field in the DCI format indicates the time resource to be a downlink time resource.

9. The user equipment of claim 8, wherein the receiver is further configured to receive configuration information for a number of PDCCH candidates wherein the CCEs for a PDCCH candidate are determined according to a common search space and the PDCCH reception is in one of the PDCCH candidates.

10. The user equipment of claim 8, wherein the receiver is further configured to receive configuration information indicating a set of downlink time resources, a set of uplink time resources, and a set of flexible time resources for a cell, wherein an indication by a corresponding field in the DCI format is applicable only to the set of flexible time resources.

11. The user equipment of claim 10, wherein, for a time resource from the set of flexible time resources, the indication by the field in the DCI format is that the time resource is a downlink time resource or an uplink time resource.

12. The user equipment of claim 11, wherein the DCI format has same size as a DCI format scheduling reception of system information and wherein functionality of the DCI format is determined by a radio network temporary identifier (RNTI) scrambling cyclic redundancy check (CRC) bits of the DCI format.

13. The user equipment of claim 8, wherein the DCI format is applicable after a predetermined time.

14. The user equipment of claim 8, wherein the PDCCH reception is in a secondary cell.

15. A method, comprising:
transmitting configuration information for:
a transmission periodicity for a physical downlink control channel (PDCCH) conveying a downlink control information (DCI) format wherein the PDCCH transmission is over a number of control channel elements (CCEs),
a number of CCEs for the PDCCH transmission,
a size for the DCI format, and
a set of locations in the DCI format for a respective set of fields corresponding to a set of cells; and
dropping a reception in a time resource of a cell from the set of cells when a respective field in the DCI format indicates the time resource to be a downlink time resource.

16. The method of claim 15, wherein the transmitter is further configured to transmit configuration information for a number of PDCCH candidates wherein the CCEs for a PDCCH candidate are determined according to a common search space and the PDCCH transmission is in one of the PDCCH candidates.

17. The method of claim 15, wherein the transmitter is further configured to transmit configuration information indicating a set of downlink time resources, a set of uplink time resources, and a set of flexible time resources for a cell, wherein an indication by a corresponding field in the DCI format is applicable only to the set of flexible time resources.

18. The method of claim 17, wherein for a time resource from the set of flexible time resources, the indication by the field in the DCI format is that the time resource is a downlink time resource or an uplink time resource.

19. The method of claim 15, wherein the indication by the field in the DCI format is applicable after a predetermined time.

20. The method of claim 15, wherein the PDCCH reception is in a secondary cell.

21. The method of claim 15, wherein the DCI format has same size as a DCI format scheduling reception of system information and wherein functionality of the DCI format is determined by a radio network temporary identifier (RNTI) scrambling cyclic redundancy check (CRC) bits of the DCI format.

22. A base station, comprising:
a transmitter configured to transmit configuration information for:
a transmission periodicity for a physical downlink control channel (PDCCH) conveying a downlink control information (DCI) format wherein the PDCCH transmission is over a number of control channel elements (CCEs),
a number of CCEs for the PDCCH transmission,
a size for the DCI format, and
a set of locations in the DCI format for a respective set of fields corresponding to a set of cells; and
a receiver configured to drop a reception in a time resource of a cell from the set of cells when a respective field in the DCI format indicates the time resource to be a downlink time resource.

23. The base station of claim 22, wherein the transmitter is further configured to transmit configuration information for a number of PDCCH candidates wherein the CCEs for a PDCCH candidate are determined according to a common search space and the PDCCH transmission is in one of the PDCCH candidates.

24. The base station of claim 22, wherein the transmitter is further configured to transmit configuration information indicating a set of downlink time resources, a set of uplink time resources, and a set of flexible time resources for a cell, wherein an indication by a corresponding field in the DCI format is applicable only to the set of flexible time resources.

25. The base station of claim 24, wherein, wherein for a time resource from the set of flexible time resources, the indication by the field in the DCI format is that the time resource is a downlink time resource or an uplink time resource.

26. The base station of claim 22, wherein the indication by the field in the DCI format is applicable after a predetermined time.

27. The base station of claim 22, wherein the PDCCH reception is in a secondary cell.

28. The base station of claim 22, wherein the DCI format has same size as a DCI format scheduling reception of system information and wherein functionality of the DCI format is determined by a radio network temporary identifier (RNTI) scrambling cyclic redundancy check (CRC) bits of the DCI format.

* * * * *